US012791226B2

(12) United States Patent
Dechant et al.

(10) Patent No.: US 12,791,226 B2
(45) Date of Patent: Nov. 10, 2026

(54) TRACKING DEVICE FOR SOLAR MODULES

(71) Applicant: SCHLETTER INTERNATIONAL B.V., Amsterdam (NL)

(72) Inventors: Gabriel Dechant, Gstadt am Chiemsee (DE); Jan Zapfe, Grafing (DE)

(73) Assignee: Schletter International B.V., Amsterdam (NL)

(*) Notice: Subject to any disclaimer, the term of this patent is extended or adjusted under 35 U.S.C. 154(b) by 0 days.

(21) Appl. No.: 18/835,440

(22) PCT Filed: Jan. 31, 2023

(86) PCT No.: PCT/EP2023/052284
§ 371 (c)(1),
(2) Date: Aug. 2, 2024

(87) PCT Pub. No.: WO2023/148153
PCT Pub. Date: Aug. 10, 2023

(65) Prior Publication Data

US 2025/0146710 A1 May 8, 2025

(30) Foreign Application Priority Data

Feb. 3, 2022 (DE) ..................... 10 2022 102 605.1

(51) Int. Cl.
*F24S 50/20* (2018.01)
*H02S 20/32* (2014.01)
*F24S 30/00* (2018.01)

(52) U.S. Cl.
CPC .............. *F24S 50/20* (2018.05); *H02S 20/32* (2014.12); *F24S 2030/134* (2018.05)

(58) Field of Classification Search
None
See application file for complete search history.

(56) References Cited

U.S. PATENT DOCUMENTS 2,337,359 A * 12/1943 Thompson .............. F16H 27/06
74/436
2012/0152316 A1 6/2012 Fischer
(Continued)

FOREIGN PATENT DOCUMENTS

CN 104539230 A 4/2015
CN 214154254 U 9/2021
(Continued)

OTHER PUBLICATIONS

Search Report issued in German Application No. 102022102605.1.
Search Report issued in International Application No. PCT/EP2023/0582284.

*Primary Examiner* — Dustin Q Dam
(74) *Attorney, Agent, or Firm* — The Webb Law Firm

(57) ABSTRACT

A tracking device for solar modules is disclosed. The tracking device comprises a pivoting unit, wherein the pivoting unit has a drive arch and a connected cross member that is pivotable about a pivot axis, wherein the drive arch has drive recesses and retaining recesses that are alternatingly disposed circumferentially, a post at which the cross member is pivotably mounted about a pivot axis, a transmission that is rotated about a rotational axis, wherein the transmission has a drive element that engages into one of the drive recesses and a holding member that engages into one of the retaining recesses, a shaft that is coupled with the transmission, and a drive unit that is attached to the post, wherein the drive unit has a motor-driven output member, wherein the output member, shaft, and transmission are coupled to one another at a joint axial coupling point in a torque-transmitting manner.

20 Claims, 23 Drawing Sheets

(56) References Cited

U.S. PATENT DOCUMENTS

| | | | | |
|---|---|---|---|---|
| 2014/0182654 | A1 | 7/2014 | Agullo | |
| 2014/0338659 | A1 | 11/2014 | Corio | |
| 2018/0128515 | A1 | 5/2018 | Habdank | |
| 2021/0058025 | A1 * | 2/2021 | Dechant | H02S 20/32 |
| 2021/0297038 | A1 | 9/2021 | Maldonado Ferreira | |

FOREIGN PATENT DOCUMENTS

| | | | | |
|---|---|---|---|---|
| DE | 202017006862 | U1 | 9/2018 | |
| DE | 102018002460 | A1 * | 9/2019 | F24S 30/425 |
| EP | 2532989 | A1 | 12/2012 | |
| EP | 3769019 | A1 | 1/2021 | |
| EP | 3883128 | A1 | 9/2021 | |
| EP | 3937370 | A1 | 1/2022 | |
| KR | 20140119281 | A | 10/2014 | |
| WO | 2011009508 | A2 | 1/2011 | |
| WO | 2013139745 | A2 | 9/2013 | |
| WO | 2014105426 | A1 | 7/2014 | |
| WO | 2014186079 | A2 | 11/2014 | |
| WO | 2016192766 | A1 | 12/2016 | |
| WO | 2018009634 | A1 | 1/2018 | |
| WO | 2022233973 | A1 | 11/2022 | |

* cited by examiner

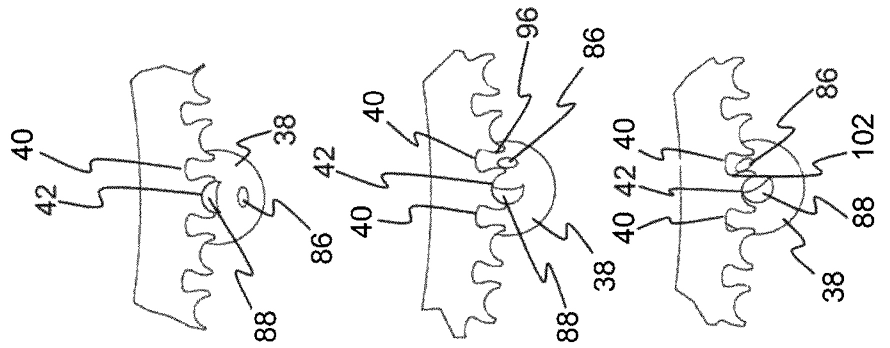
Figure 16b
Figure 17b
Figure 18b
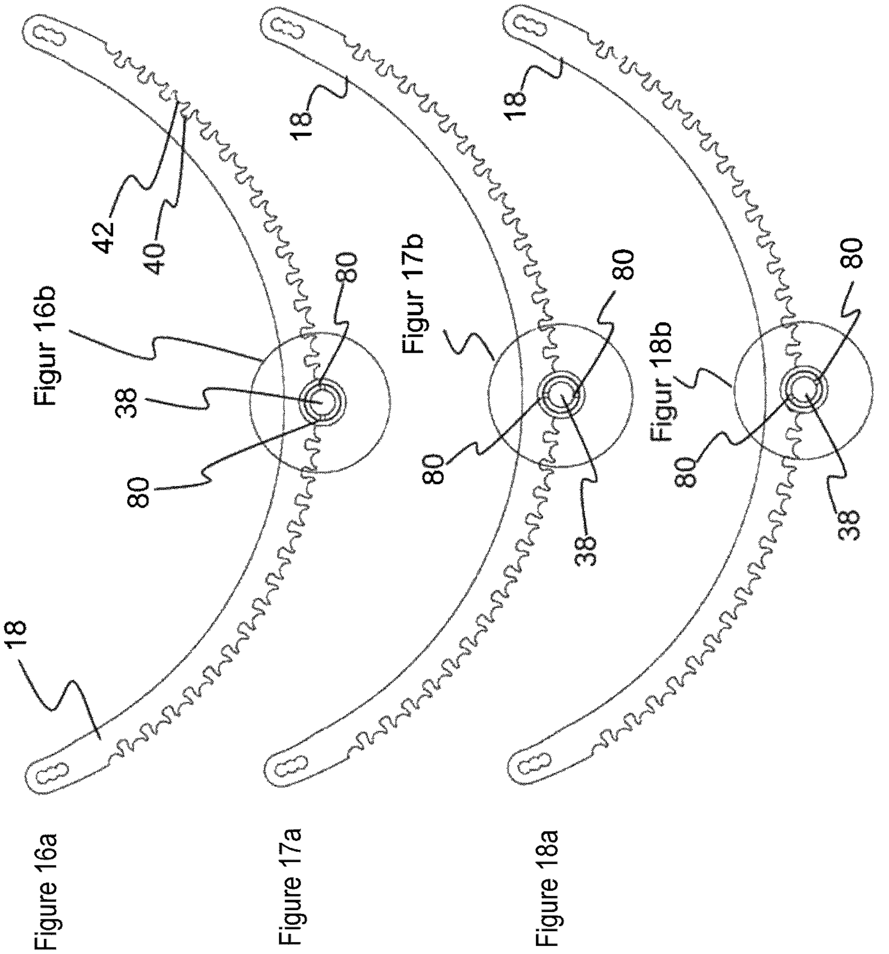
Figure 16a
Figure 17a
Figure 18a

TRACKING DEVICE FOR SOLAR MODULES

CROSS-REFERENCE TO RELATED APPLICATIONS

The present application is a U.S. national stage application under 35 U.S.C. § 371 of PCT Application No. PCT/EP2023/052284 filed Jan. 31, 2023, which claims priority to German Patent Application No. 10 2022 102 605.1 filed Feb. 3, 2022, the entire disclosures of which are incorporated herein by reference.

The present invention relates to a tracking device for solar modules. Such tracking devices are for tracking the position of the sun with the solar modules.

Tracking apparatuses for solar modules are known from the prior art and are, for example, disclosed in WO 2016/192766 A1. The publication WO 2016/192766 A1 discloses a tracking apparatus for solar modules with a series of posts arranged along a longitudinal axis. A cross member is pivotably mounted on each post, wherein the cross members are pivotable about a joint pivot axis extending parallel to the longitudinal axis. A gear ring is fastened to each cross member of which the toothing is in engagement with a motor-driven gear that is mounted at the respective post. The gear and the gear ring have to be secured against a transversal shift by separate devices.

It is an object of the present invention to provide a tracking device for solar modules that has a compactly designed drive with increased functionality.

This object is achieved with a tracking device for solar modules having the features of claim 1.

Further embodiments are provided in the appended dependent claims.

The tracking device for solar modules comprises at least one pivoting unit, wherein the at least one pivoting unit has at least one drive arch and at least one cross member that is pivotable about a pivot axis, the at least one cross member being connected to the at least one drive arch, wherein the at least one drive arch has drive recesses and retaining recesses that are alternatingly disposed circumferentially, at least one post on which the at least one cross member is pivotably mounted about the pivot axis, at least one transmission member that is rotatable about a rotational axis, wherein the at least one transmission member has at least one drive member that engages into one of the drive recesses and at least one holding member that engages into one of the retaining recesses, at least one drive shaft that is coupled with the at least one transmission member and at least one drive unit that is mounted to the at least one post, wherein the at least one drive unit has at least one motor and at least one output member, wherein the at least one output member, the at least one drive shaft and the at least one transmission member are jointly coupled at a joint axial coupling point in a torque-transmitting manner.

The at least one drive unit, the at least one drive shaft and the at least one transmission member may be jointly coupled at a single joint axial coupling point in a torque-transmitting manner.

Thus, a simple and compact design of the tracking device's drive may be achieved. Moreover, due to this axial coupling point, little time is needed to connect and disconnect the individual components during assembly or maintenance work.

The drive recesses and the retaining recesses may be configured at the radial outer peripheral surface or the radial inner peripheral surface of the drive arch. In other words, the drive recesses and the retaining recesses may be open radially inwards or radially outwards.

The at least one post may be anchored in or at the underground. The at least one post may be rammed into the underground and may be anchored in the underground that way. The at least one post may also be attached to the underground with one or several fixing anchors. For example, this may be the case if the underground is made of concrete.

The transmission member is designed in such a way that it alternately engages into one of the drive recesses and into one of the retaining recesses. If the at least transmission member engages with one of the retaining recesses, the cross member and the drive arch connected to it may be held in their adjusted pivot position without a torque being transmitted to the drive unit or one of the drive shafts connected to the pivoting unit. Thus, the components driving the pivoting unit such as, for example, the drive shaft and/or the drive unit, may be relieved. Moreover, wind-induced vibrations in the pivoting unit and the components connected to it may be prevented. Such vibrations may cause damage to the pivoting unit, the solar modules attached to it and further components connected to the pivoting unit. These vibrations may be prevented by the rigid connection of the drive arch with the at least one transmission member if the transmission member is engaged with one of the retaining recesses.

Due to the engagement of the at least one drive member into a drive recess, the drive member of the transmission member and the drive arch are coupled in such a torque-transmitting manner that performing a rotational movement of the transmission member leads to a gradual pivot or adjustment movement of the drive arch and the cross member attached to it about the pivot axis. A continuous rotational movement of the transmission member about the rotational axis correspondingly leads to a gradual pivot or adjustment movement of the drive arch and the cross member attached to it. The pivot or adjustment movement of the drive arch and the cross member attached to it is always carried out when the at least one drive member is engaged with one of the drive recesses. When a rotational movement of the transmission member is carried out, the at least one drive member may engage in one of the drive recesses, may move the drive arch and the cross member and subsequently leave the drive recess again. Between the engagement of the drive member into the drive recess and the exit of the drive recess through the drive member, the at least one drive member presses against a wall portion of the drive recess, causing a torque on the drive arch and the cross member, which leads to a pivot or adjustment movement of the drive arch and the cross member.

The at least one holding member always engages into a retaining recess, if the at least one drive member is not in engagement with one of the drive recesses. The at least one holding member may engage into the at least one retaining recess in a form-fitting manner. In this state, the drive arch may be maintained in its set position. Thus, the transmission member and the drive arch are in a blocked position. The blocked position prevents the drive arch from twisting around its rotational or pivot axis. As soon as at least one holding member engages into the retaining recess even partially, twisting the drive arch and the cross member attached to it around the pivot axis may be prevented. If the transmission member is powered further, the holding member leaves the retaining recess again and releases the drive arch for an adjustment step initiated by the drive member.

If the at least one transmission member is powered further, the holding member and the drive member continue to turn so that the drive member may be engaged with the next drive recess. The drive member may, for example, be rotated about the rotational axis of the drive arrangement after exiting a drive recess to be engaged with the next drive recess. At the same time, the at least one holding member continues to turn in the retaining recess and leaves the retaining recess if or shortly after the drive member engages with the next drive recess. The at least one holding member thus releases the drive arch for the next adjustment step.

The at least one output member, the at least one drive shaft and the at least one transmission member may be disposed coaxially.

The at least one drive shaft may extend through the at least one drive unit. Starting from the axial coupling point, the drive shaft may extend through the at least one drive unit and may be coupled with a further drive shaft or a further drive shaft piece or a further pivoting unit or a further transmission member with its other end.

The at least one drive unit may have at least one gearbox. The gearbox may be coupled with the at least one motor. The at least one drive shaft may extend through the at least one gearbox.

At least one coupling member may be provided at the axial coupling point for coupling the at least one output member, the at least one drive shaft and the at least one transmission member in a torque-transmitting manner. The at least one axial coupling point may be configured such that only a single coupling member is needed for coupling. The coupling member may extend perpendicular in one direction to the rotational axis of the drive shaft through the output member, the drive shaft and the transmission member. The output member, the drive shaft and the transmission member may have corresponding openings through which the coupling member may extend. The coupling member may be a bolt or a screw.

An elastic member may be disposed at the axial coupling point to compensate the angle. The at least one elastic member may be disposed in the radial direction between the at least one transmission member and the at least one drive shaft. The at least one elastic member may compensate angular deflections, misalignments, ramming and assembly tolerances. The at least one elastic member may also be fastened at the coupling point through the at least one coupling member. The at least one elastic member may be configured in the form of a sleeve. The sleeve may have a radial outwardly protruding collar, with which it may support itself on the front end of the drive shaft. The sleeve may have a radial inwardly protruding collar on its respective other axial end, with which it may support itself on the front end of the at least one transmission member.

The pivoting units may be configured such that the center of gravity of the arrangement coincides with the pivot axis or the associated location of a pivot. However, it is also conceivable that the center of gravity does not coincide with the pivot axis or the associated location of pivot.

The at least one motor may have a rotational axis extending at least substantially parallel to the rotational axis of the at least one drive shaft. As an alternative, it is conceivable that the rotational axis of the at least one motor extends at an angle to the rotational axis of the at least one drive shaft. Additionally or alternatively, the rotational axis of the motor may, at least substantially, extend parallel or at an angle to the pivot axis.

The at least one drive member may have a cross section deviating from a circular cross section and exhibiting, at least in sections, a curved cross section. The cross section of the at least one drive member may at least have one first apex and at least one second apex. The distance between the first apex and the second apex may determine the largest extension of the drive member. The cross section of the at least one drive member may have its largest extension in a direction transverse to the radial direction of the drive device, meaning in tangential direction. Alternatively, the cross section of the at least one drive member may have at least one first edge and one second edge, wherein their distance from each other defines the largest extension of the drive member. If two edges are provided at the cross section of the drive member, the cross section of the drive member may have two curved portions extending between the two edges. If the cross section of the drive member has two apexes, the cross section may also be curved in the area of the apexes. Thus, the cross section of the drive members may have several curvature radii. The curvature radius in the area of the apexes may differ from the curvature radius of the portion between the two apexes.

The cross section of the at least one drive member may at least have one third apex and at least one fourth apex. The distance between the third apex and the fourth apex may be smaller than the distance between the first apex or the first edge and the second apex or the second edge. The third apex and the fourth apex may be in alignment in radial direction of the at least one transmission member. The distance between the first apex and the second apex may be matched to the cross section of the drive recesses. As a result of the cross section of the drive member being reduced in the radial direction, in particular the drive recesses with a minimized cross section at the entry opening may be configured, since due to its form, the at least one drive member only needs little space to dip the corresponding drive recess.

As a result of the distance between the third apex and the fourth apex, which is smaller than the distance between the first apex and the second apex, the tangential shifts between the drive arch and the transmission member, which are created due to tolerances, may be compensated, so that the engagement of the at least one drive member into the associated drive recess may be ensured. Based on the distance between the third and the fourth apex, among other things, meaning based on the cross section of the drive member reduced in the radial direction, the size of the radial free space between the at least one holding member and the at least one drive member that may supports the alternating engagement of the drive member and the holding member into the associated drive recesses and retaining recesses, may be determined.

The drive recesses at the drive arch may have a cross section that changes in the radial direction. The drive recesses may have opposite wall portions, wherein the distance from one another changes in a radial direction. Both opposing wall portions may define the entry opening of the at least one drive recess for the at least one drive member between them.

The at least one drive recess may expand outwardly or inwardly in a radial direction. Due to the outwardly or inwardly expansion of the drive recess in a radial direction, the entry opening of the drive recess for dipping or engaging the drive member may be enlarged.

The drive recesses at the drive arch may have a reduced cross section in a central area in a radial direction. Compared to the central area, the drive recesses may have a larger cross section in the area of the entry opening and in a radial end area. The opposing wall portions of the drive recesses may have a reduced distance to each other in the central area in a radial direction. The distance of both wall portions may be smaller in the central area than in the area of the entry opening and the radial end area. The drive recesses may have an undercut contour.

The opposing wall portions of the drive recess may be curved. Each of the curved wall portions may have an apex. At the apexes of the curvature, the opposing wall portions have the smallest distance to each other. Starting from the entry opening, the distance of the opposing wall portions up to the apexes may be reduced. Starting from the apexes, the distance of the wall portions to each may be increased in the direction of the radial end of the drive recesses. The opposing wall portions may have a convex curvature.

Through this cross section of the drive recesses, the at least one drive member may have a larger or broader configuration in the tangential direction, meaning that the distance between the first apex and the second apex of the drive member may be correspondingly larger. Accordingly, the at least one drive member may absorb greater forces and may be sturdier overall.

The drive recesses configured in such a way further contribute to the fact that assembly tolerances and manufacturing tolerances may be compensated. With the drive recesses or through their described form, a relative movement between the drive arch and the transmission member may be blocked longer by the at least one drive member, so that a premature release of the at least one drive arch due to a movement of the drive arch may be prevented under strain. Thus, unwanted movements of the drive arch can be prevented reliably.

The at least one transmission member may have two coupling portions. The coupling portions may be tubular. The coupling portions are configured to be coupled with a drive shaft and a drive shaft piece, respectively.

The rotational axis of the at least one transmission member may run through or along the at least one holding member, meaning that there may be a distance between the rotational axis and the holding member. The at least one holding member may have a curved outer contour. The curvature of the outer contour of the holding member may be adjusted to the curvature of the at least one retaining recess, so that the at least one holding member may enter the at least one retaining recess and may rotate inside the retaining recess. As soon as the at least one holding member enters the at least one retaining recess, twisting the drive arch about the rotational or pivot axis may be prevented. The curvature radius of the curved outer contour may be adjusted to the curvature radius of the wall of the at least one retaining recess.

The at least one holding member of the at least one transmission member may have an outer contour in the form of a circular arc and a curved surface that faces the at least one drive member. The curved surface may be curved concavely.

The post may have at least one fastening portion and at least one anchoring portion. The at least one pivoting unit and the at least one drive unit may be disposed laterally at the fastening portion.

The fastening portion and the anchoring portion of the post may be implemented as separate post pieces that are connectable with each other. The fastening portion and the anchoring portion may be configured such that by connecting the two portions of the post, terrain roughnesses and ramming tolerances as well as changes in elevation and angular deflections resulting from this may be compensated for.

At least one mounting member for attaching the drive unit to the at least one post may be provided. The mounting member may be attached laterally to the post. The at least one mounting member may have an opening through which the axial coupling point may be accessed.

The at least one transmission member may have at least one abutment element. The at least one drive member and the at least one holding member may be connected to each other via at least one abutment element. The abutment element may extend in the radial direction. The abutment element may, for example, be disk-shaped or cam-shaped. The at least one abutment element may further be connected to at least one coupling portion via which the at least one transmission member may be coupled with at least one drive shaft. The at least one transmission member may have two abutment elements between which the at least one drive member and the at least one holding member extend. The two abutment elements may form a guide for the drive arch. The drive arch may extend between the two abutment elements.

The tracking device may have at least one suspension for supporting the at least one drive shaft. The at least one suspension may have at least one connecting member and at least one support member. The at least one connecting member may be a bar, a cord, a cable, a chain or a wire. The at least one connecting member may be attached to at least one carrier member.

The carrier member may be a cross member, a subcarrier supporting the solar modules or a crossbar extending between the support rails. The at least one connecting member may extend towards the at least one support member that contacts the at least one drive shaft to support it. The at least one support member may be located below the at least one carrier member. Thus, the at least one support member may hang below the at least one carrier member.

The tracking device may have at least one adapter element for attaching bifacial solar modules. The at least one adapter element may have a bearing portion for bearing it on a support rail and a support portion, which is configured to attach the bifacial solar modules to it. The bearing portion may have at least one receptacle channel for a fastening member. The at least one adapter element may at least extend in sections parallel to one of the support rails.

The at least one adapter element may at least have one positioning protrusion used to position the adapter element on the support rails. The at least one adapter element may form a spacer to minimize the shading at the back side of bifacial solar modules.

In the following, an embodiment of the invention is described as an example with reference to the accompanying figures. In the drawings.

Figure 15A:
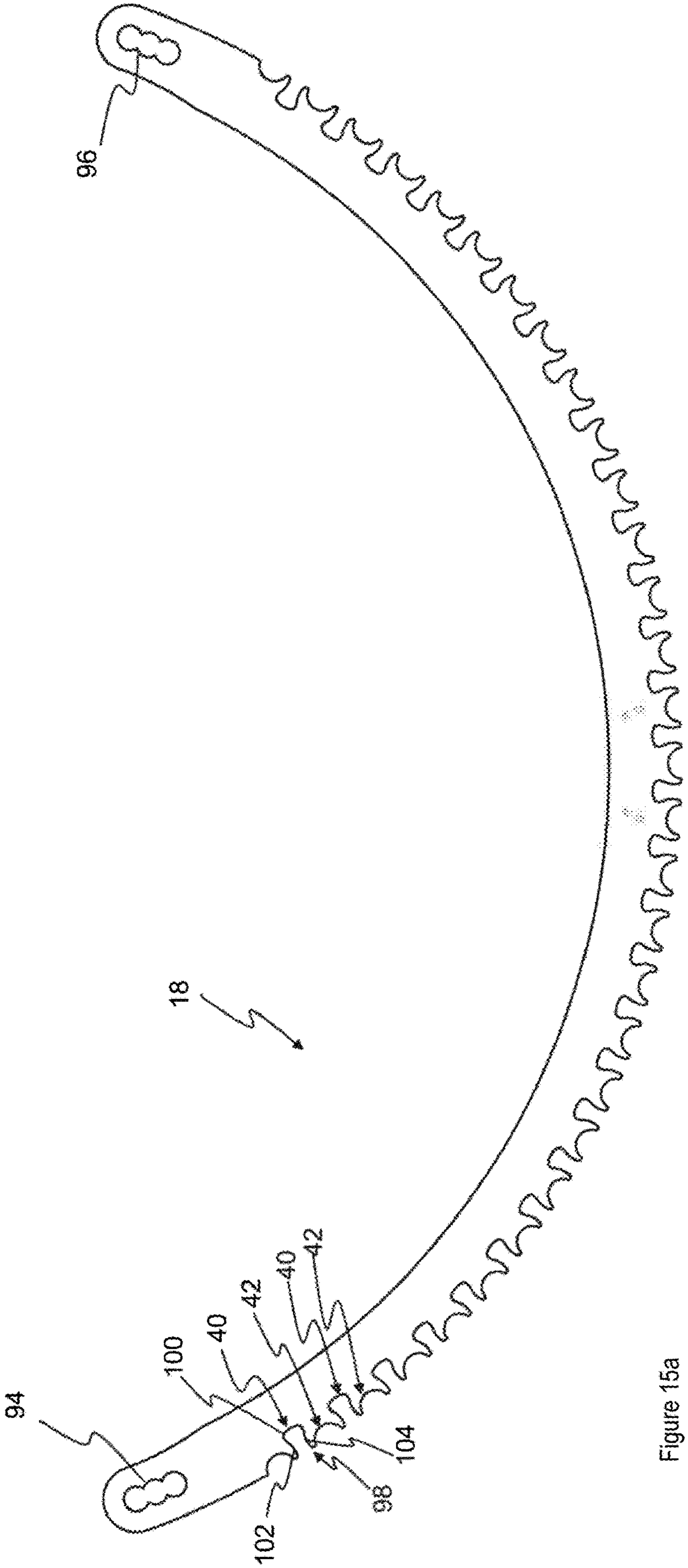
Figure 15B:
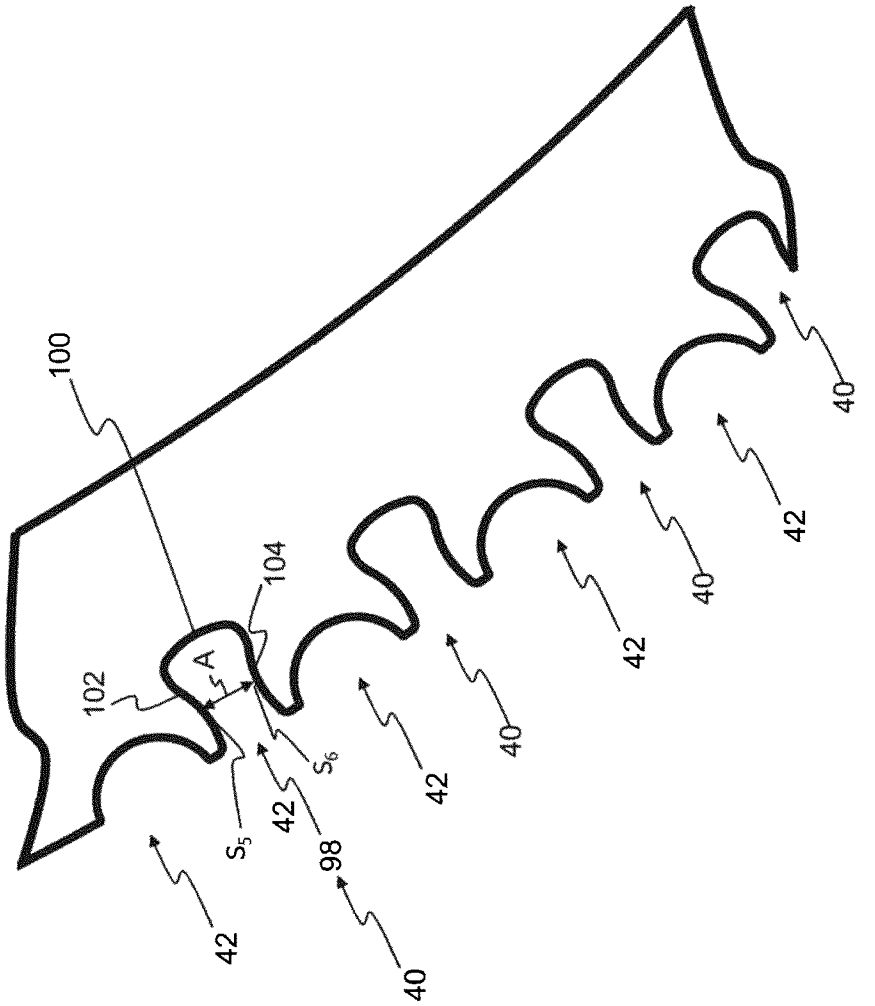
Figure 19:
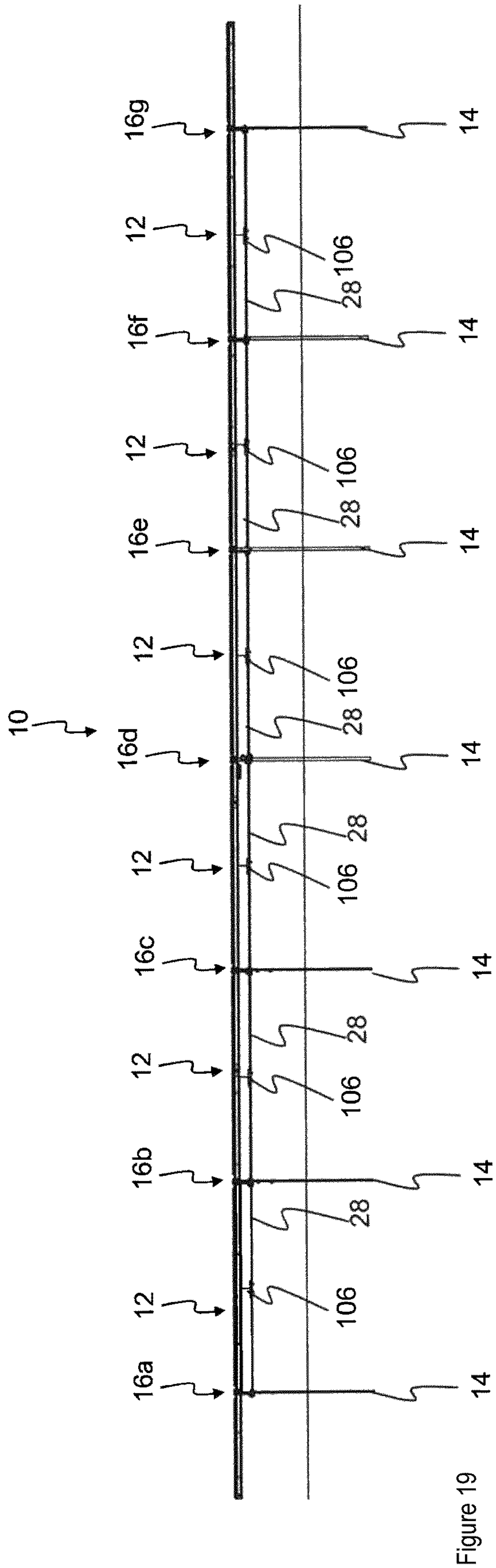
Figure 20:
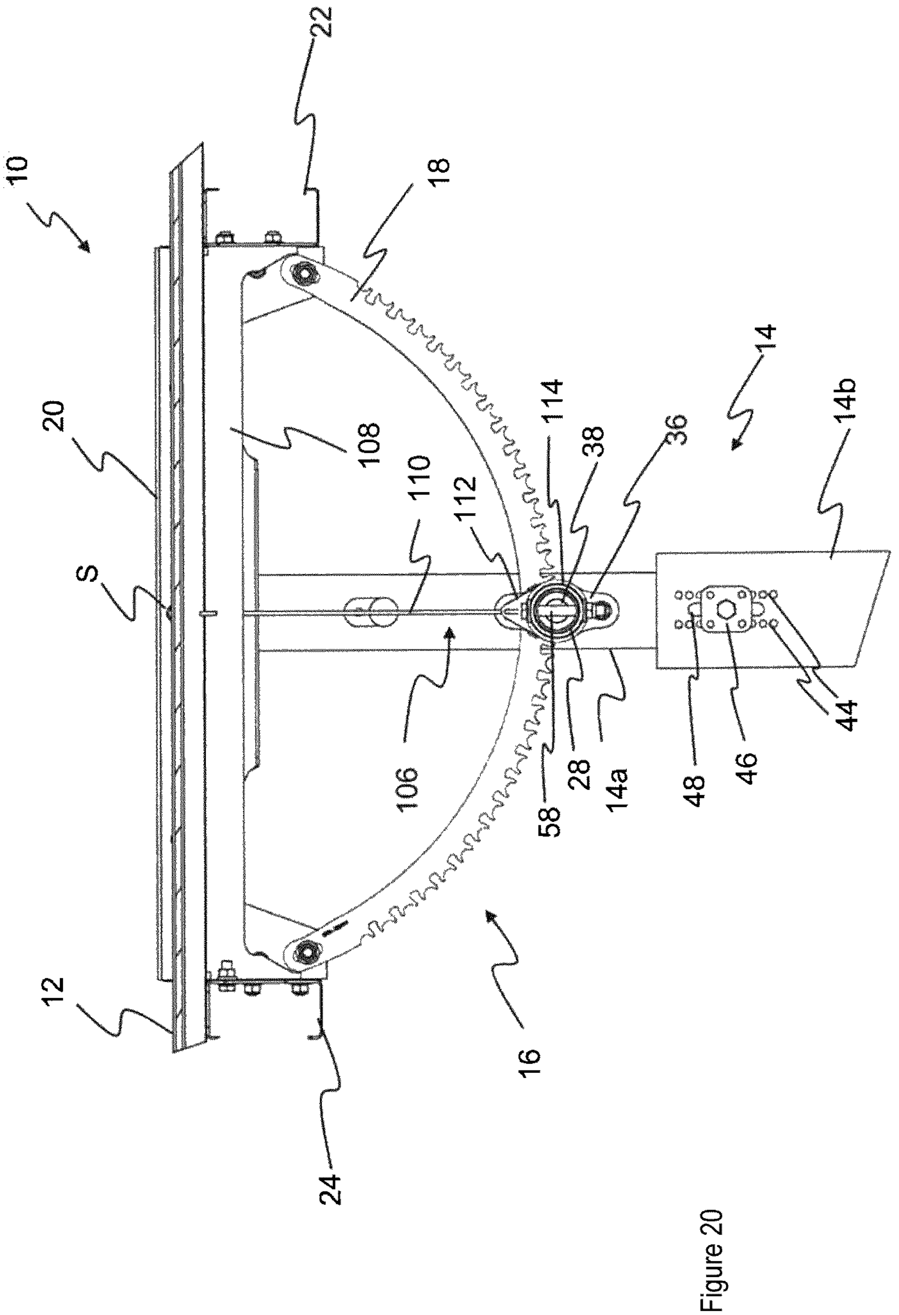
Figure 21:
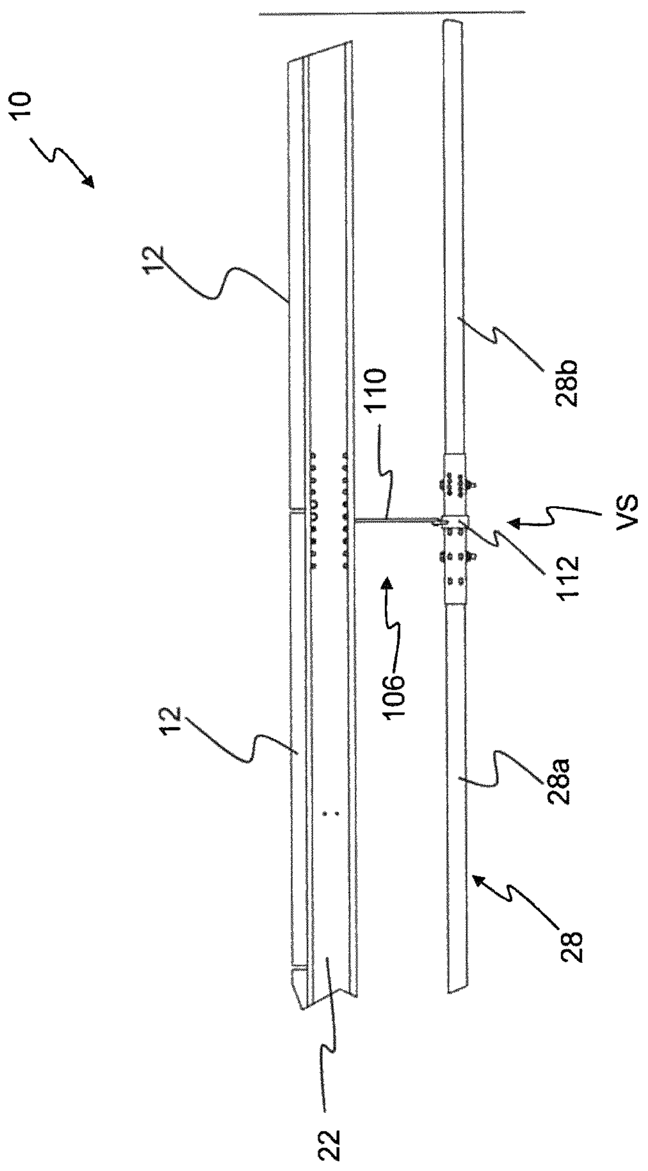
Figure 23:
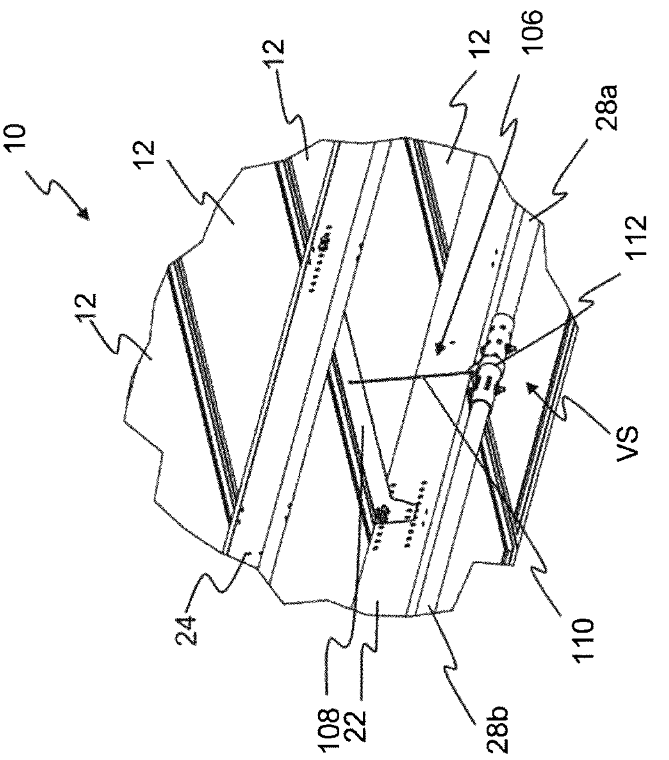
Figure 22:
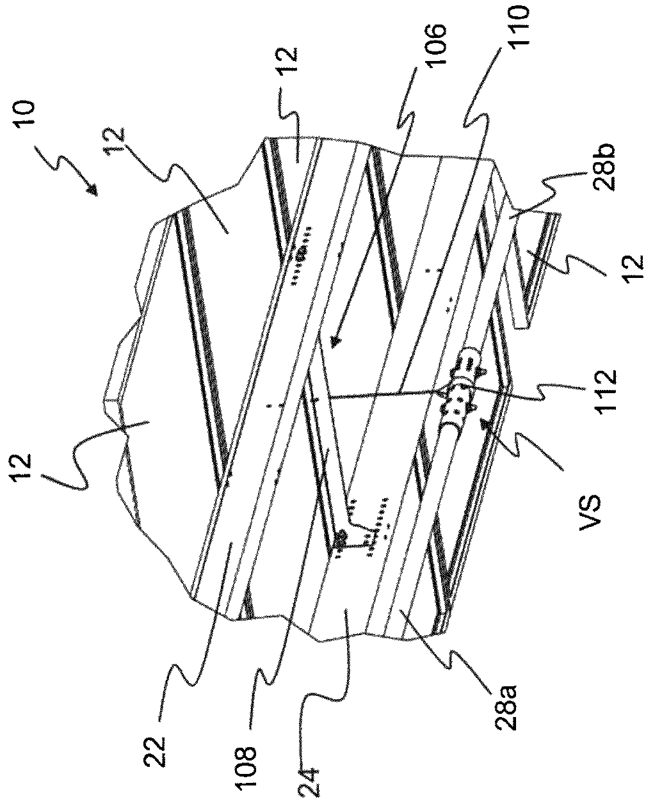
Figure 24:
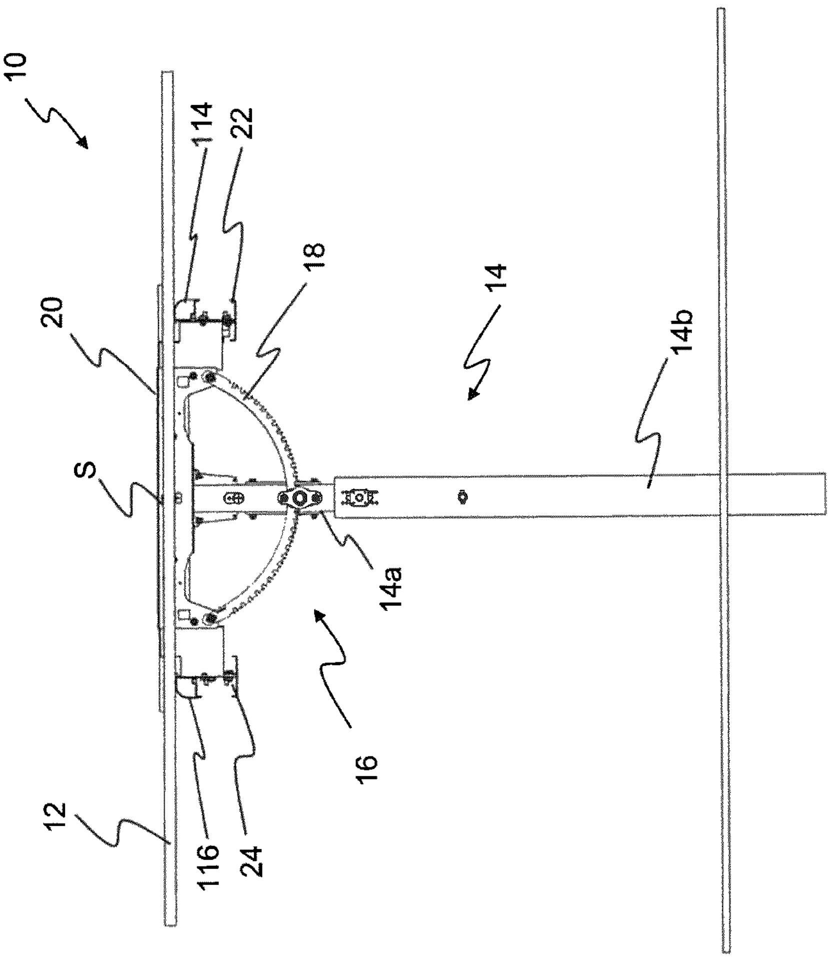
Figure 25:
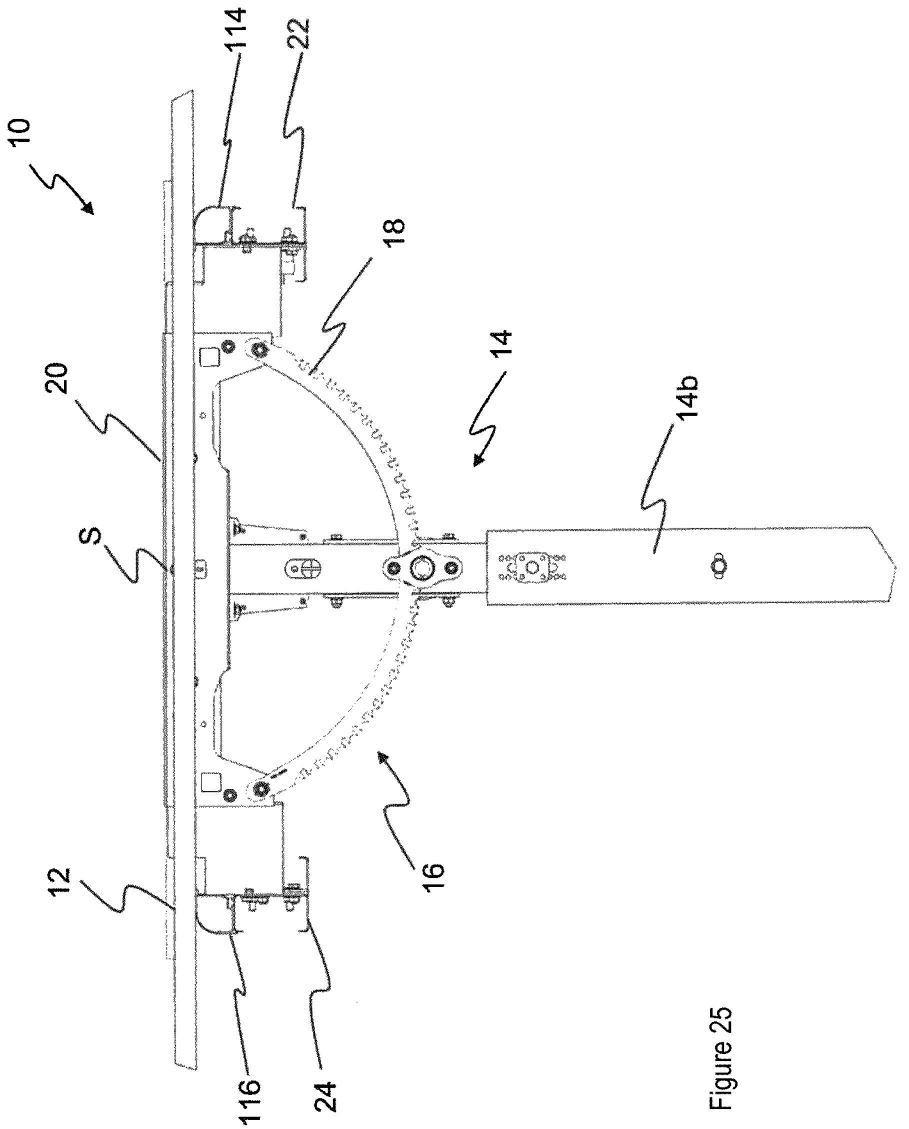
Figure 26:
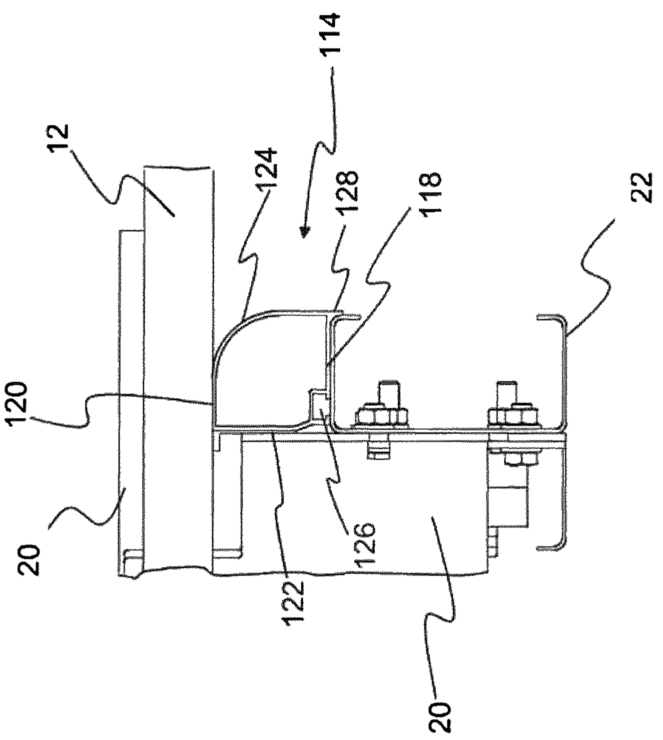

FIGS. 15*a* and 15*b* are views of a drive arch;

FIGS. 16*a* to 18*b* are views of the drive arch and the transmission member in different positions;

FIG. 19 is a view of the tracking device with a suspension for the drive shaft;

FIG. 20 is a view of the suspension for the drive shaft;

FIGS. 21 to 23 are a further view of the tracking device with suspension; and FIGS. 24 to 26 are views of a tracking device with adapter elements for bifacial solar modules.

Figure 1:
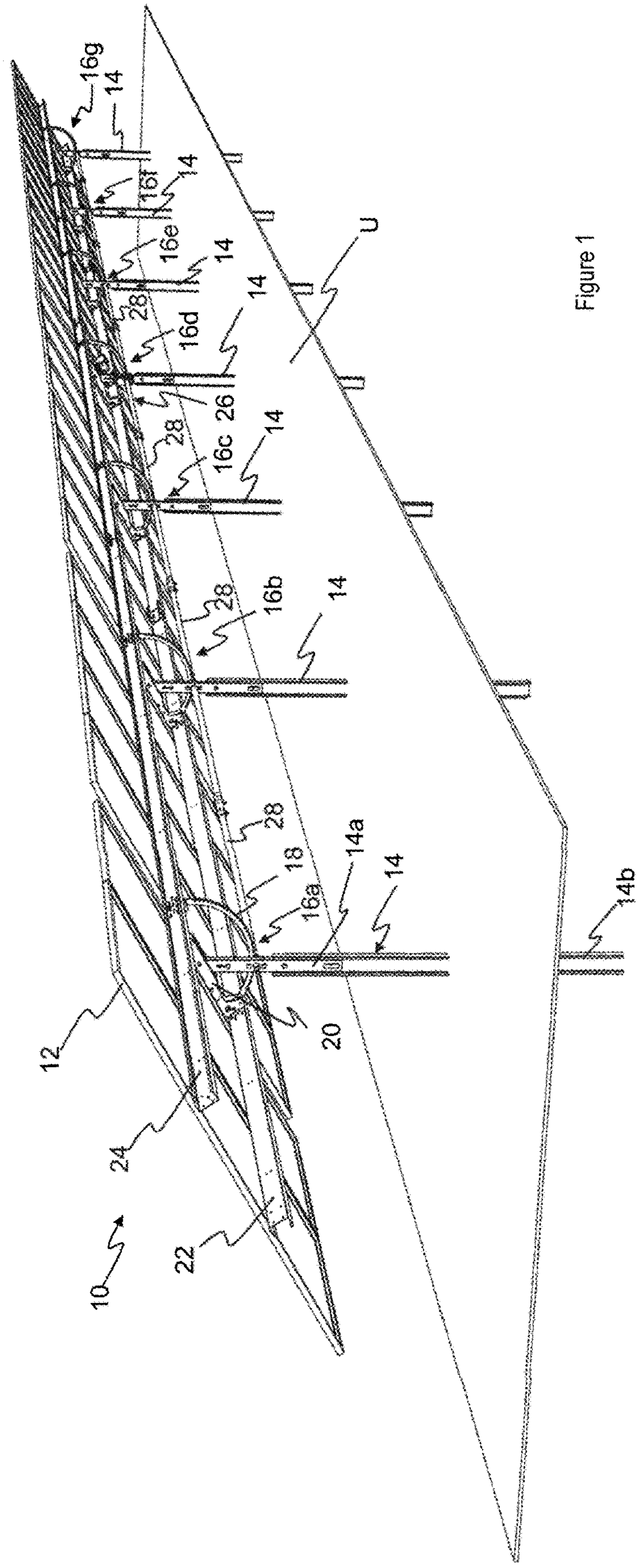
FIG. 1 is a perspective view of a tracking device.

FIG. 1 shows a perspective view of a tracking device 10 for solar modules 12. The tracking device 10 tracks the position of the sun with the solar modules 12. The tracking device 10 comprises several posts 14 and several pivoting units 16*a* to 16*g*. The tracking device 10 or the pivoting units 16*a* to 16*g* are anchored to the underground U via the posts 14. The posts 14 comprise two portions. The posts 14 comprise a fastening portion 14*a* and an anchoring portion 14*b*. The anchoring portion 14*b* is anchored to the underground U. Subsequently, the fastening portion 14*a* may be attached to the anchoring portion 14*b* with one of the pivoting units 16*a* to 16*g*.

Each of the pivoting units 16 comprises a drive arch 18 and a cross member 20. For reasons of clarity, only the post portions 14*a*, 14*b*, the drive arch 18 and the cross member 20 of the front pivoting unit 16*a* shown in FIG. 1 have a reference sign. The pivoting units 16*a* to 16*g* are connected with each other via support rails 22 to 24. The support rails 22 to 24 are attached to the cross members 20. The support rails 22 to 24 carry the solar modules 12 fastened to the support rails 22 to 24. The tracking device 10 is configured especially for arranging the solar modules 12 in the portrait orientation. In the portrait orientation, the solar modules 12 are arranged vertically or in portrait format.

The tracking device 10 comprises a drive unit 26. The drive unit 26 is disposed at the post 14 of the pivoting unit 16*d* and powers the pivoting units 16*a* to 16*g* via the drive shafts or the drive shaft pieces 28. The drive shafts 28 couple the pivoting units 16*a* to 16*g* with each other in a torque-transmitting manner. The torque created by the drive unit 26 disposed at the pivoting unit 16*d* may be transmitted to the remaining pivoting units 16*a* to 16*c* and 16*e* to 16*g* via the drive shafts 28.

Figure 2:
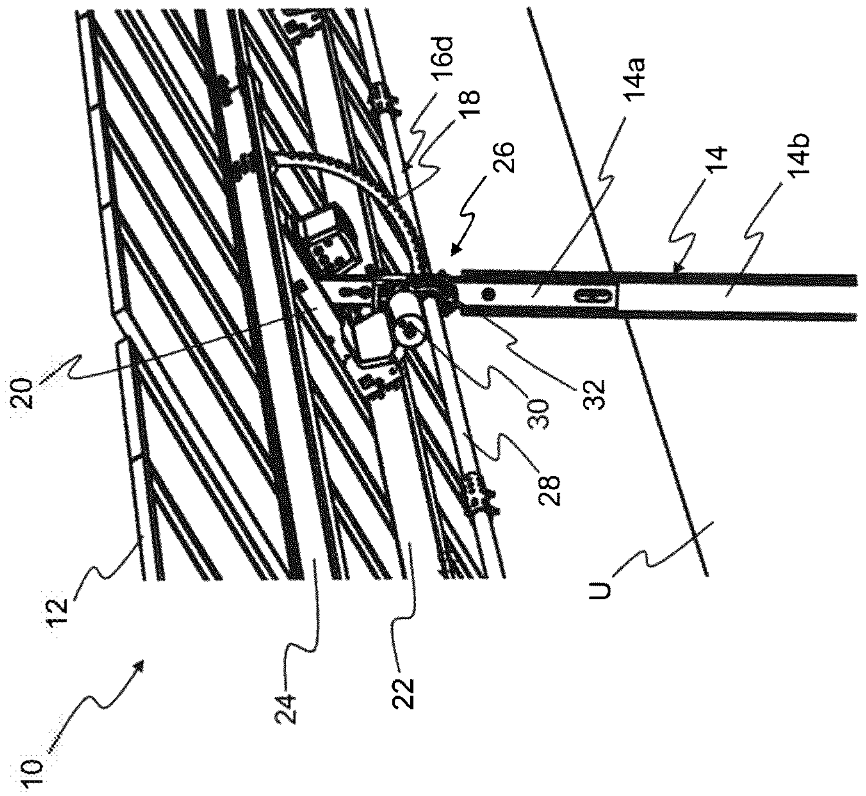
FIG. 2 is an enlarged view of the section in FIG. 1.

FIG. 2 shows an enlarged view of the section in FIG. 1, in which especially the pivoting unit 16*d* and the drive unit 26 are shown. The drive unit 26 is disposed at a post 14. The post 14 comprises two portions. The post 14 is composed of the fastening portion 14*a* and an anchoring portion 14*b* that is anchored to the underground U. The drive unit 26 and the pivoting unit 16*d* are attached to the fastening portion 14*a* that comprises the drive arch 18 and the cross member 20. The drive unit 26 comprises a motor 30 and a gearbox 32.

Figure 3:
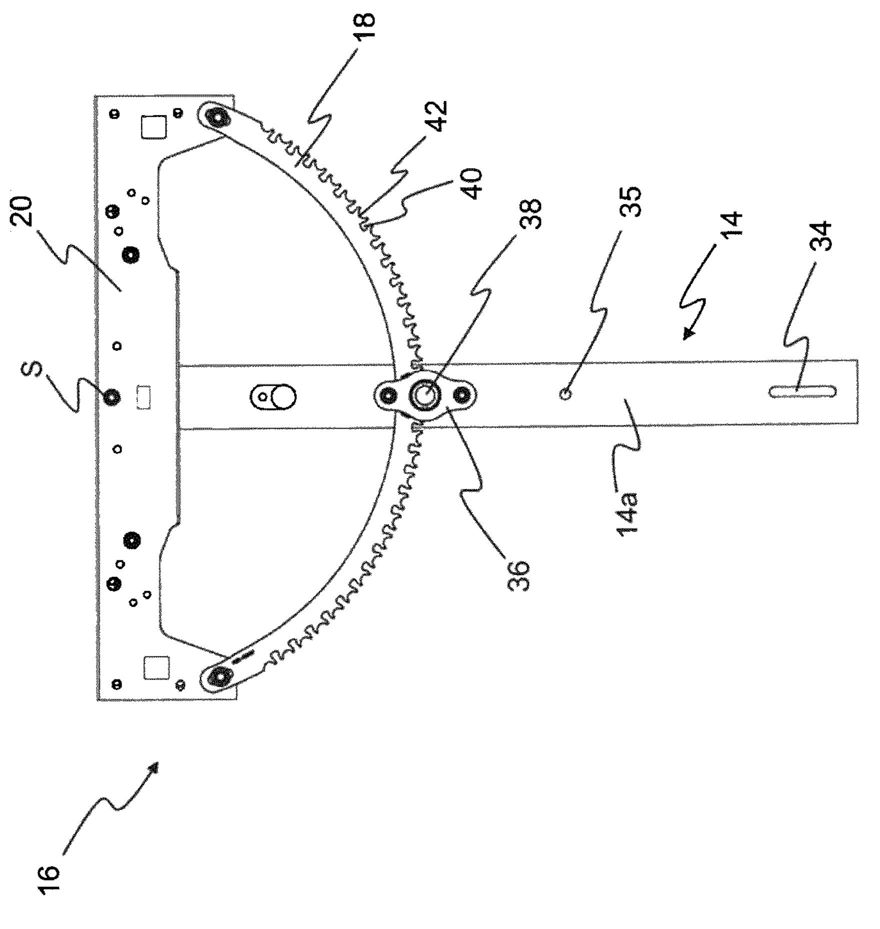
FIGS. 3 to 6 are different views of a pivoting unit for the tracking device according to FIG. 1.

FIG. 3 shows a view of a pivoting unit 16. The pivoting unit 16 is attached to the post 14 in such a way that it may be pivotable about the pivot axis S. The pivoting unit 16 comprises the drive arch 18 and the cross member 20. The drive arch 18 is fastened to the cross member 20. The cross member 20 is pivotably attached to the post 14. FIG. 3 shows the fastening portion 14*a* of post 14. The fastening portion 14*a* has an elongated hole 34 and an opening 35 that are used to connect the anchoring portion 14*b* shown in FIGS. 1 and 2. The opening 35 is provided above the elongated hole 34. The pivoting unit 16 and a bearing member 36 are attached to the fastening portion 14*a*. The bearing member 36 supports a transmission member 38, wherein only its front end is visible in FIG. 3. The transmission member 38 transmits a torque to the drive arch 18 to pivot the pivoting unit 16. Moreover, the transmission member 38 also serves for locking the drive arch 18 in a set position.

The drive arch 18 is fastened to the cross member 20. Regarding the pivot axis S, the drive arch 18 has several recesses 40 and 42 on its radial outer side. The recesses 40 are drive recesses 40 with which the drive arch 18 may be moved and thus the pivoting unit 16 may be pivoted. The retaining recesses 42 serve for holding or locking the drive arch 18 and thus the pivoting unit 16 in the set position.

Figure 4:
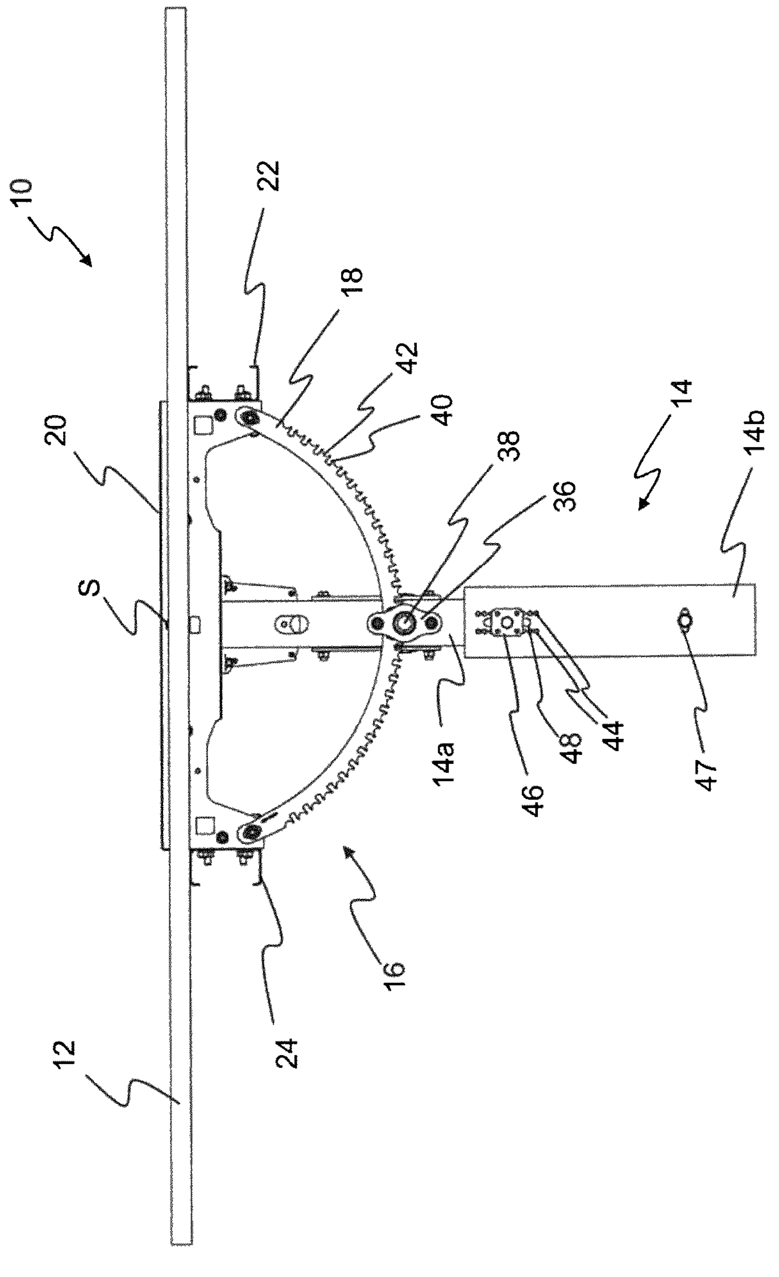

FIG. 4 shows a further view of the tracking device 10. The support rails 22 and 24 are fastened to the cross member 20 via screwed connections. The support rails 22 and 24 carry the solar modules 12. The cross member 20 protrudes the upper edge of the solar module 12 in the vertical direction. This means that the cross member 20 and thus the pivoting unit 16 are disposed in the direction of the pivot axis S between two adjacent solar modules 12. The pivoting units 16 are configured in such a way that the center of gravity of the arrangement coincides with the pivot axis S or the associated location of a pivot.

The fastening portion 14*a* and the anchoring portion 14*b* of the post 14 are connected with each other. The anchoring portion 14*b* has two rows of holes 44, a retaining clip 46, an opening 47 and an elongated hole 48. The elongated hole 48 is located between the two rows of holes 44. Together with a retaining clip 46, the rows of holes 44 retain the adjusted height of the fastening portion 14*a*. The opening 47 is provided below the rows of holes 44 and the elongated hole 48 at the anchoring portion 14*b*. The opening 47 is caterpillar-shaped in the embodiment shown.

The elongated hole 34 and the opening 35 at the fastening portion 14*a* (see FIG. 3) interact with the elongated hole 48 and the opening 47 at the anchoring portion 14*b* to adjust the height and angle of the fastening portion 14*a*. The set height of the fastening portion 14*b* may be set or retained via the retaining clip 46 that engages with the two rows of holes 44 at the anchoring portion 14*b*. The angle between the fastening portions 14*a* and 14*b* may be adjusted via the caterpillar-shaped opening 47.

Figure 5:
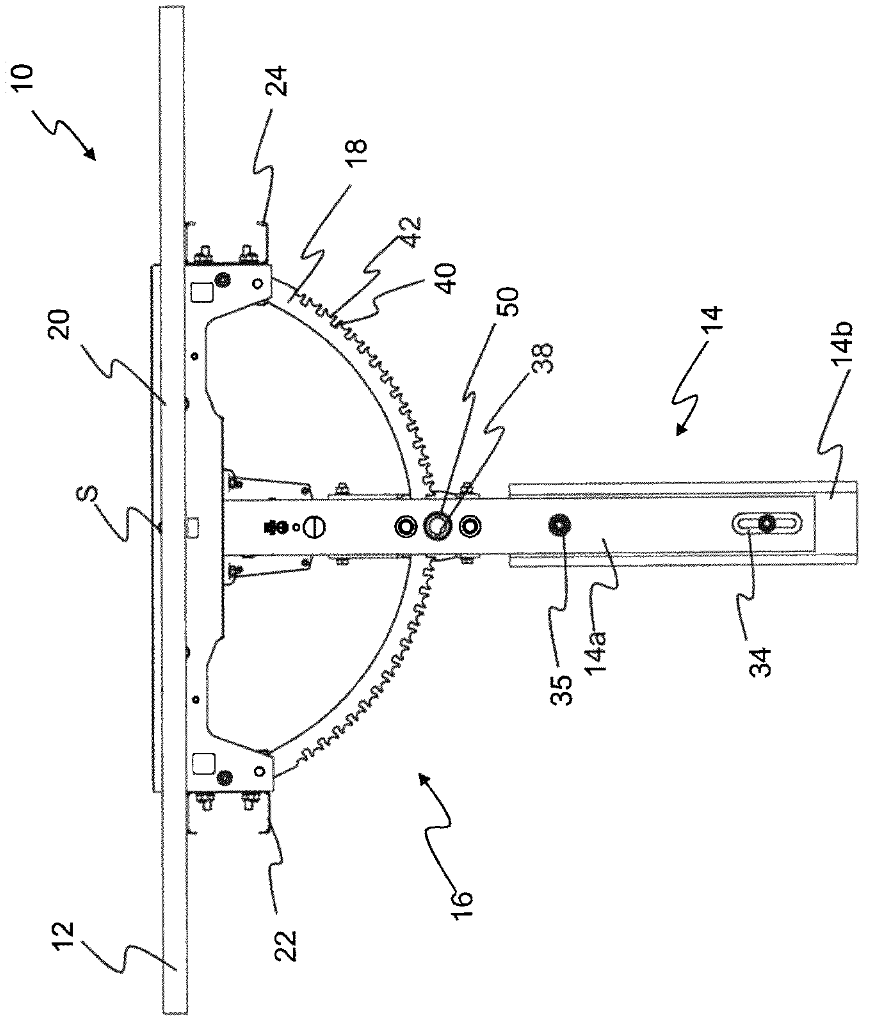

FIG. 5 shows a view of the tracking apparatus 10 that shows, compared to FIGS. 3 and 4, the other axial side of the post 14 and the pivoting device 16. FIG. 5 shows the fastening portion 14*a*. The fastening portion 14*a* comprises the elongated hole 34 and the opening 35 mentioned above. The fastening portion 14*a* is connected to the elongated hole 34 and the opening 35 via fastening members with the anchoring portion 14*b*. The fastening portion 14*a* has an opening 50 through which the transmission member 38 extends.

Figure 6:
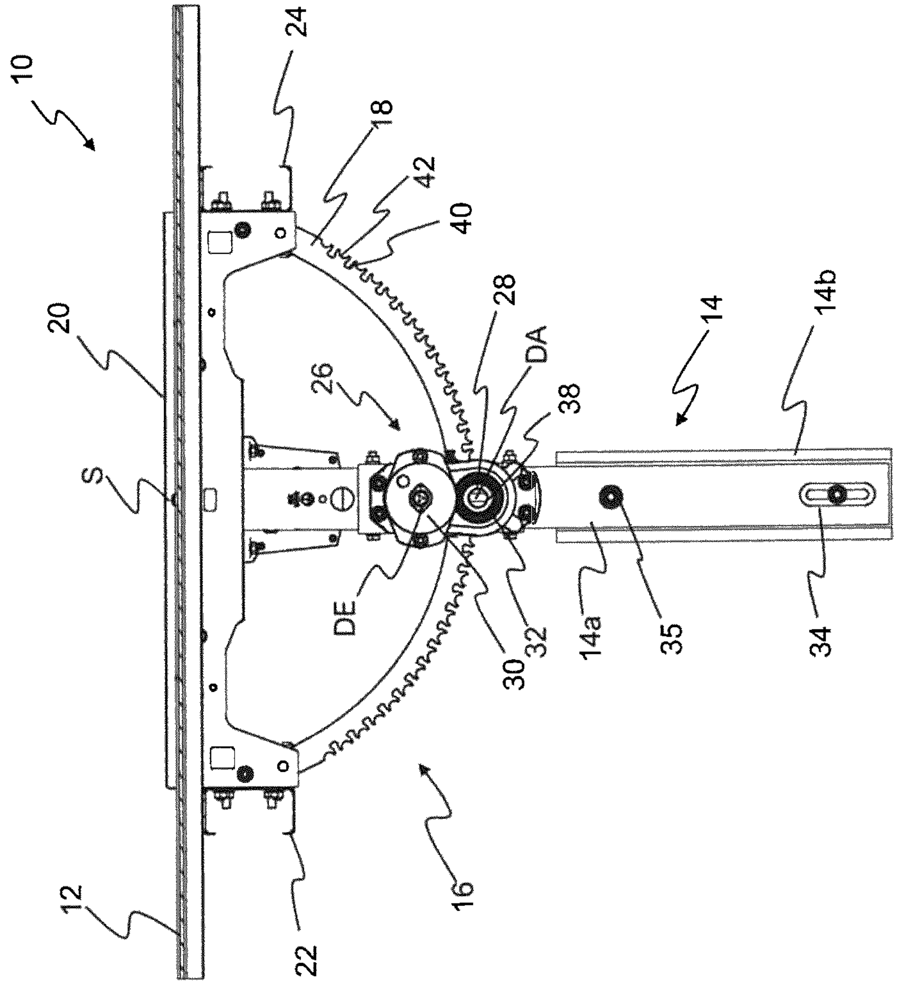

FIG. 6 shows a further view of the tracking device 10. FIG. 6 shows the same side of the tracking device 10 as FIG. 5. The drive unit 26 is disposed at the fastening portion 14*a* that comprises the motor 30 and the gearbox 32. The drive shaft 28 is coupled with the drive unit 26. The drive shaft 28 extends through the drive unit 26. The drive shaft 28 specifically extends through the gearbox 32 of the drive unit 26. The rotational axis DA of an output member (not shown) that coincides with the rotational axis of the drive shaft 28 substantially extends parallel to the pivot axis S. The rotational axis DE of the motor 30 substantially extends parallel to the pivot axis S as well. Correspondingly, the rotational axis DA of the output member and the drive shaft 28 substantially extends parallel to the rotational axis DE of the motor 30.

Figure 7:
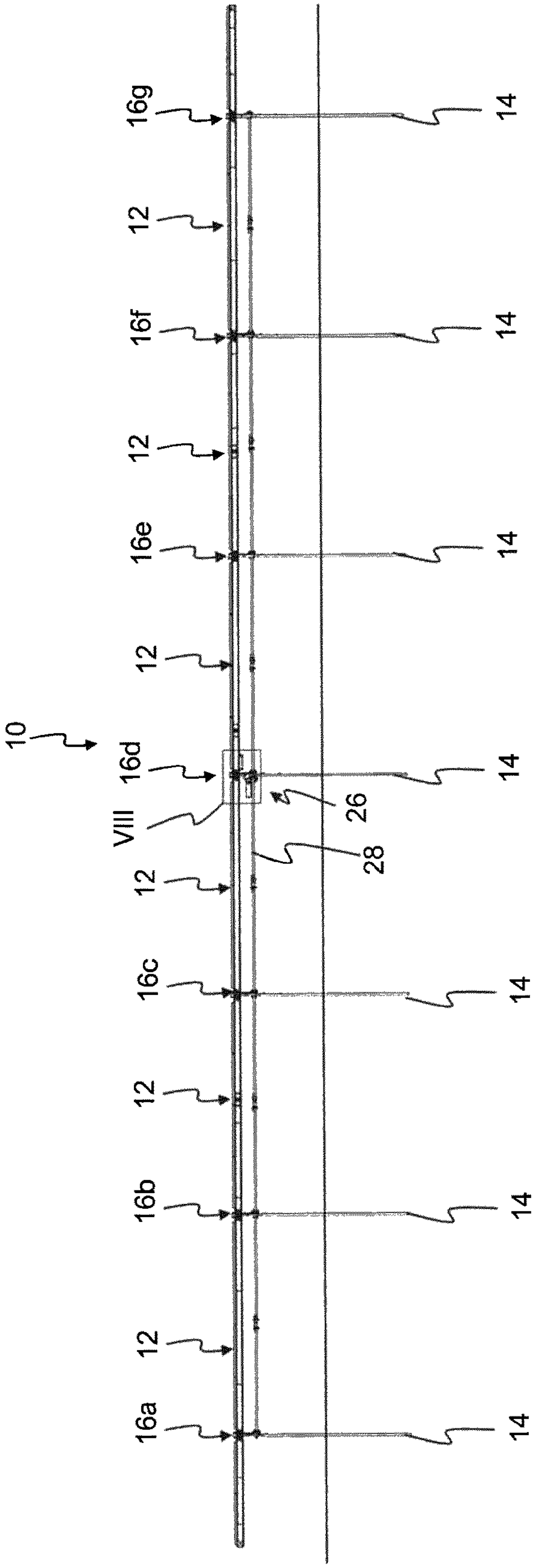
FIG. 7 is a view of the tracking device according to FIG. 1.

FIG. 7 shows a view of the tracking apparatus 10. The pivoting units 16*a* to 16*g* are disposed in the axial direction in the space between the solar modules 12. Due to this arrangement of the pivoting units 16*a* to 16*g*, in which the posts 14 are disposed between the solar modules 12, the center of gravity coincides with the pivot axis or the associated location of a pivot. The pivoting units 16*a* to 16*g* are connected with each other via drive shafts 28 to power the individual pivoting units 16*a* to 16*g* and to be able to pivot the solar modules 12 about the pivot axis S (see FIGS. 3 to 6). According to this embodiment, the drive unit 26 is disposed at the central pivoting unit 16*d* or post 14 shown in FIG. 7, to which the pivoting unit 16*d* is attached.

Figure 8:
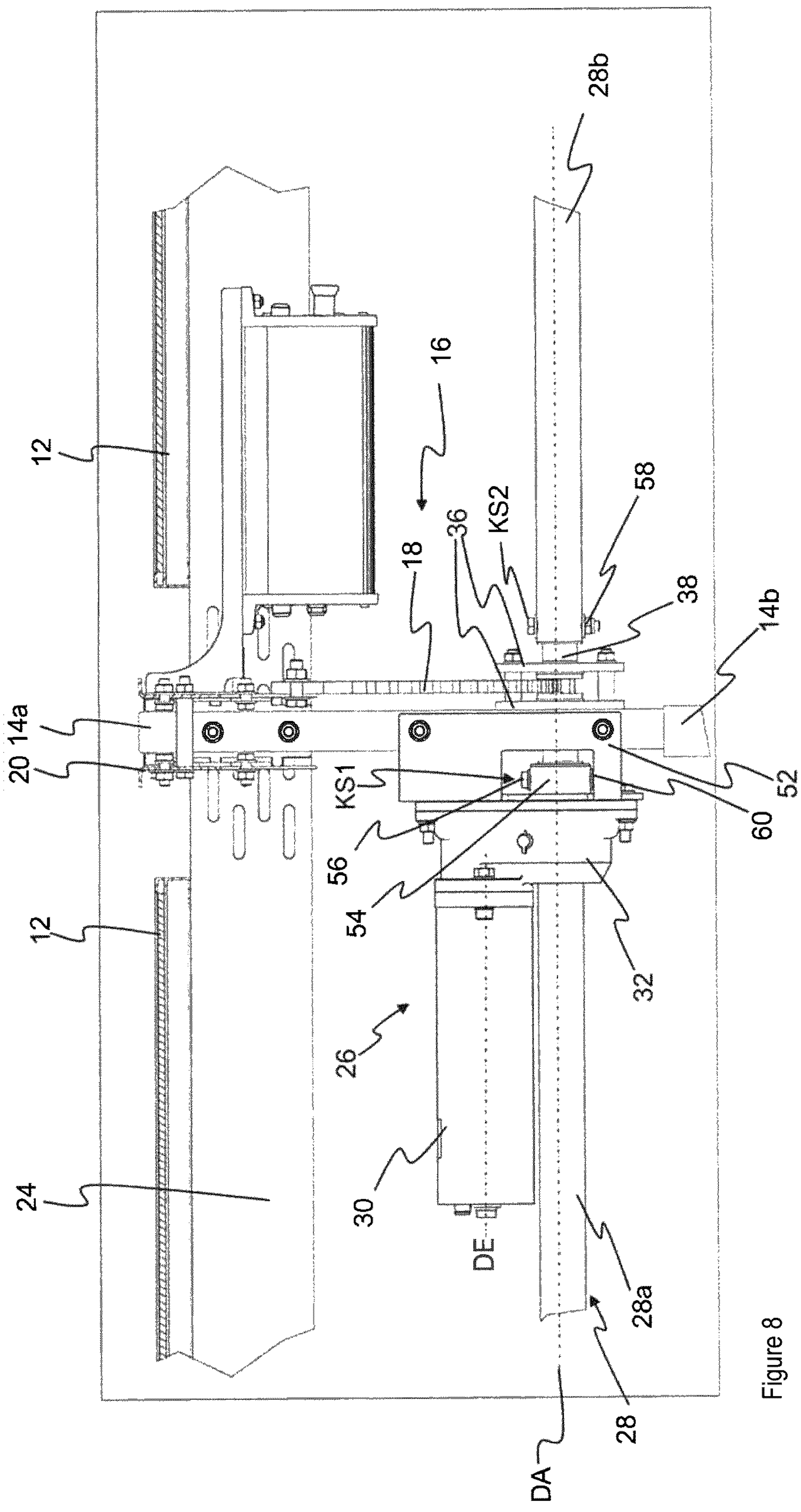
FIG. 8 is an enlarged view of section VIII in FIG. 7.

FIG. 8 shows an enlarged view of section VIII in FIG. 7. The drive shaft 28 is composed of several drive shaft pieces 28*a* and 28*b*. The drive shaft pieces 28*a* and 28*b* are coupled with each other in a torque-transmitting manner via the transmission member 38 in the area of the pivoting unit 16.

The transmission member 38 is configured to power the drive arch 18 so that it pivots the pivoting unit 16 and to secure the drive arch 18 in a position that has been set once to maintain the pivoting unit 16 in this position. The transmission member 38 is engaged with the drive arch 18 for this purpose. The main function of the transmission member 38 is powering and locking the drive arch 18. Apart from this main function, the transmission member 38 provides coupling of the drive shaft pieces 28*a* and 28*b* in a torque-transmitting manner. The transmission member 28 is rotatably mounted at the two bearing members 36. The two bearing members 36 are fastened at the fastening portion 14*a*.

A mounting member 52 for the drive unit 26 is laterally attached to the fastening portion 14*a*. The motor 30 and the gearbox 32 are fastened to the mounting member 52. In the axial direction, the gearbox 32 is disposed between the mounting member 52 and the motor 30. The motor 30 is located in the vertical direction above the drive shaft piece 28*a*. The rotational axis DE of the motor 30 extends at least substantially parallel to the rotational axis DA of the drive shaft 28, an output member 54 of the drive unit 26 and the transmission member 38. In other words, the rotational axes of the drive shaft 28, the output member 54 and the transmission member 38 coincide in the rotational axis DA.

The drive shaft 28 or the drive shaft piece 28*a*, the output member 54 and the transmission member 38 are connected with each other at a single joint axial coupling point KS1. According to this embodiment, the drive shaft 28, the output member 54 and the transmission member 38 are connected at the coupling point KS1 via a single coupling member 56, meaning via a single bolt 56. The holding member 52 has an opening 60 via which the coupling point KS1 is accessible.

The drive unit 26 is disposed at an axial side of the post 14 and is attached via the mounting member 52. The drive arch 18 and the bearing members 36 are disposed on the other axial side of the post 14. Thus, the post 14 is disposed in axial direction between the drive unit 26 and the drive arch 18.

The transmission member 38 is coupled with the drive shaft piece 28*b* at the coupling point KS2. The drive shaft piece 28*b* and the transmission member 38 are coupled via a single coupling member 58, meaning via a single bolt 58.

Figure 9:
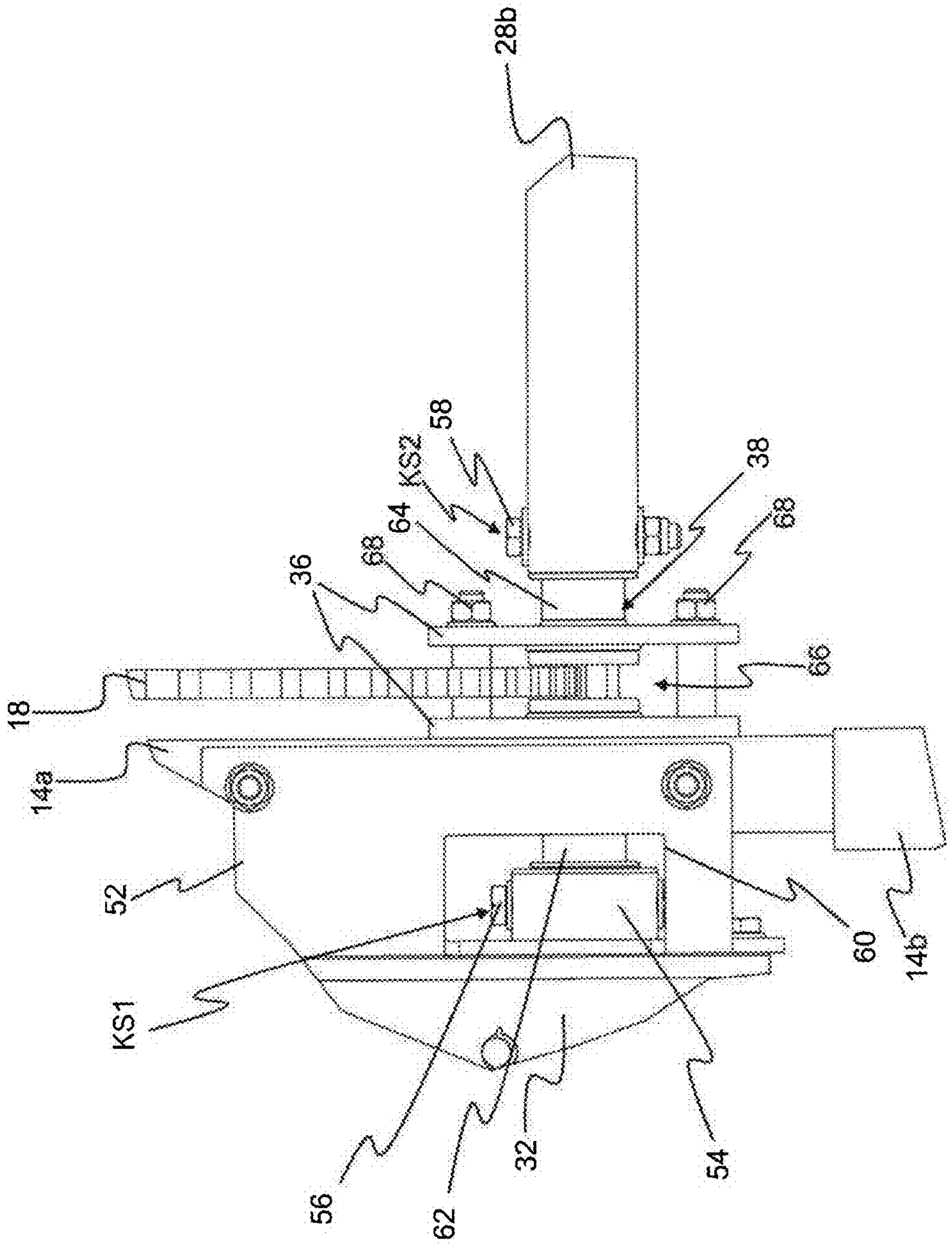
FIG. 9 is an enlarged view of the section in FIG. 8.

FIG. 9 shows an enlarged view of the section in FIG. 8. The transmission member 38 has two coupling portions 62 and 64. The engagement portion 66, via which the transmission member 38 is in engagement with the drive arch 18, is disposed between the coupling portions 62 and 64. The transmission member 38 is rotatably mounted at the two bearing members 36. The bearing members 36 are secured to the fastening portion 14*a* via bolts 68. The drive arch 18 extends in axial direction between the two bearing members 36. The coupling portion 64 of the transmission member 38 and the drive shaft piece 28*b* are coupled at the axial coupling point KS2 via the bolt 58 in a torque-transmitting manner.

Figure 10:
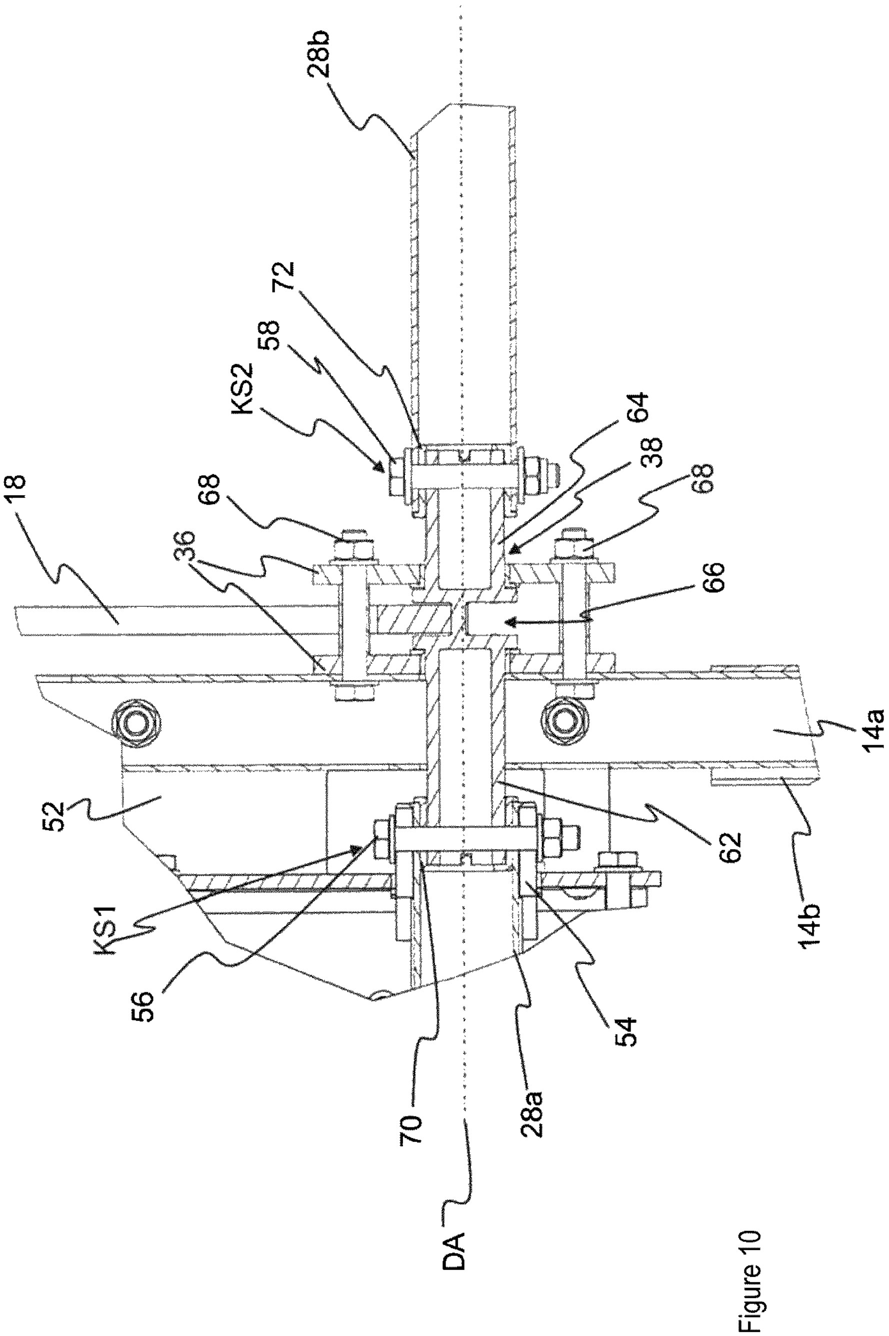
FIG. 10 is a sectional view of the enlarged section according to FIG. 9.

FIG. 10 shows the section in accordance with FIG. 9 in section. The transmission member 38 comprises the two tubular coupling portion 62 and 64. The engagement portion 66, via which the transmission member 38 is in engagement with the drive arch 18, is disposed between the tubular coupling portions 62 and 64 in axial direction. The tubular coupling portion 62 of the transmission member 38 extends through the post 14 in the axial direction to the coupling point KS1. The transmission member 38 is rotatably mounted at the two bearing members 36. The bearing members 36 are secured to the fastening portion 14*a* via bolts 68. The drive arch 18 extends in axial direction between the two bearing members 36.

The drive shaft piece 28*a*, the transmission member 38 and the output member 54 are coupled with each other via the bolt 56 at the coupling point KS1 in a torque-transmitting manner. The bolt 56 extends perpendicular to the rotational axis DA through the drive shaft piece 28, the output member 54 and the tubular coupling portion 62 of the transmission member 38. The drive shaft piece 28*a*, the output member 54 and the tubular coupling portion 62 of the transmission member 38 are at least disposed inside the other in sections, so that their end portions overlap in the axial direction.

An elastic element 70 in the form of a sleeve is disposed in the radial direction between the coupling portion 62 and the drive shaft piece 28*a*. The sleeve 70 encloses the end portion of the coupling portion 62 and is supported via a radial outwardly protruding collar at the front end of the drive shaft piece 28*a*. Moreover, the sleeve 70 has a radial inwardly protruding collar at its respective other axial end, with which sleeve 70 may be supported at the front end of the coupling portion 62. The sleeve 70 compensates angular misalignments between the drive shaft piece 28*a* and the transmission member 38.

The tubular coupling portion 64 and the drive shaft piece 28*b* are coupled via the bolt 58 in a torque-transmitting manner at the coupling point KS2. The bolt 58 extends perpendicular to the rotational axis DA through the coupling portion 64 and the drive shaft piece 28*b*. An elastic element 72 in the form of a sleeve is disposed in the radial direction between the tubular coupling portion 62 and the drive shaft piece 28*b*. The sleeve 72 is configured identically to the sleeve 70 described above. Accordingly, the sleeve 72 encloses the end portion of the coupling portion 64 and is supported via a radial outwardly protruding collar at the front end of the drive shaft piece 28*b*. Moreover, the sleeve 72 has a radial inwardly protruding collar at its respective other axial end, with which sleeve 72 may be supported at the front end of the coupling portion 64. The sleeve 72 compensates angular misalignments between the transmission member 38 and the drive shaft piece 28*b*.

Figure 11:
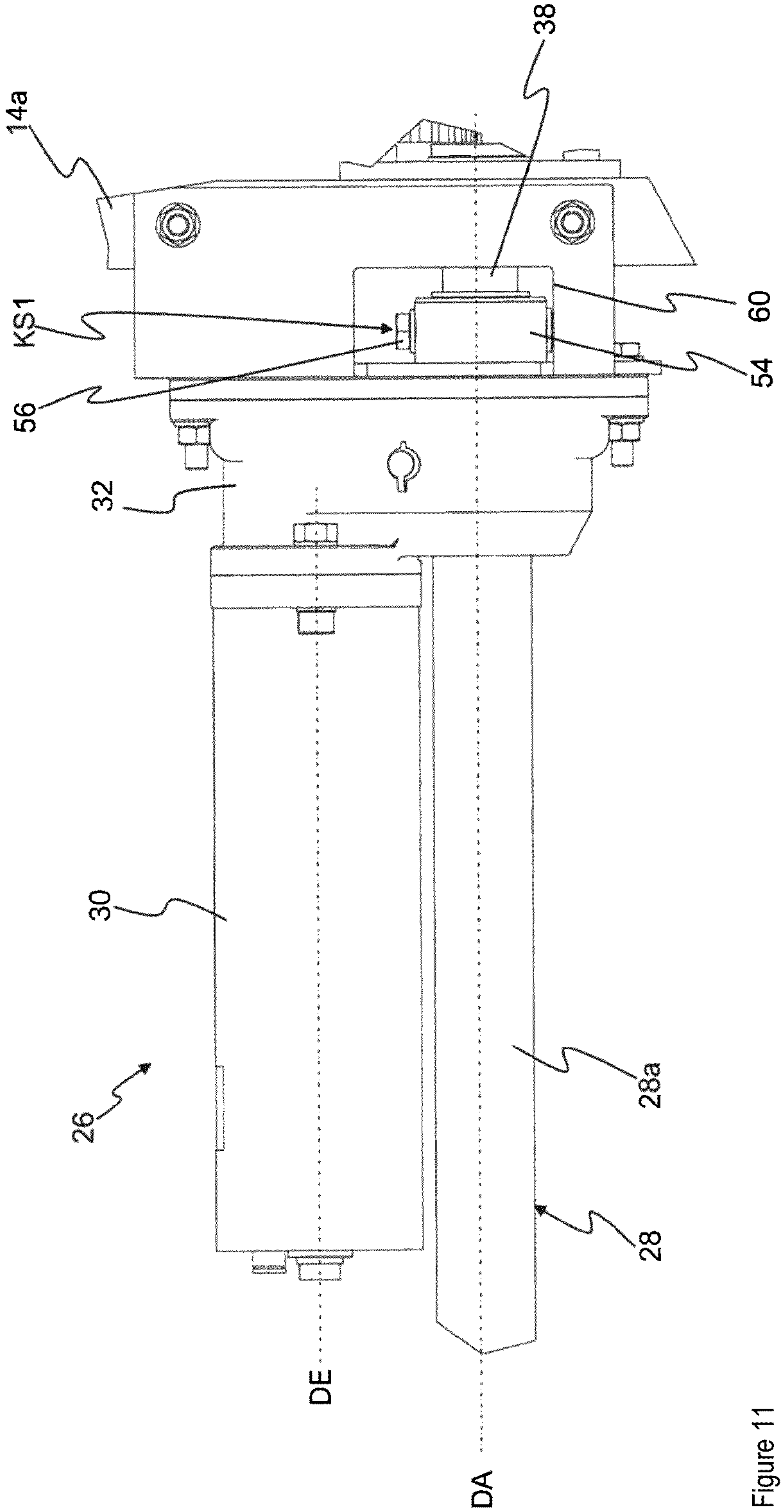
FIG. 11 is a view of an enlarged section in FIG. 8.

FIG. 11 shows an additional enlarged view of the section in FIG. 8. FIG. 11 shows the drive unit 26, which comprises the motor 30 and the gearbox 32. The drive unit 26 is coupled with the drive shaft 28 or the drive shaft piece 28*a* at the coupling point KS1 via the output member 54 and the bolt 56. The rotational axis DE of the motor 30 and the rotational axis DA, in which the rotational axis of the drive shaft piece 28*a*, the rotational axis of the output member 54 and the rotational axis of the transmission member 38 coincide, extend at least substantially parallel to each other.

Figure 12:
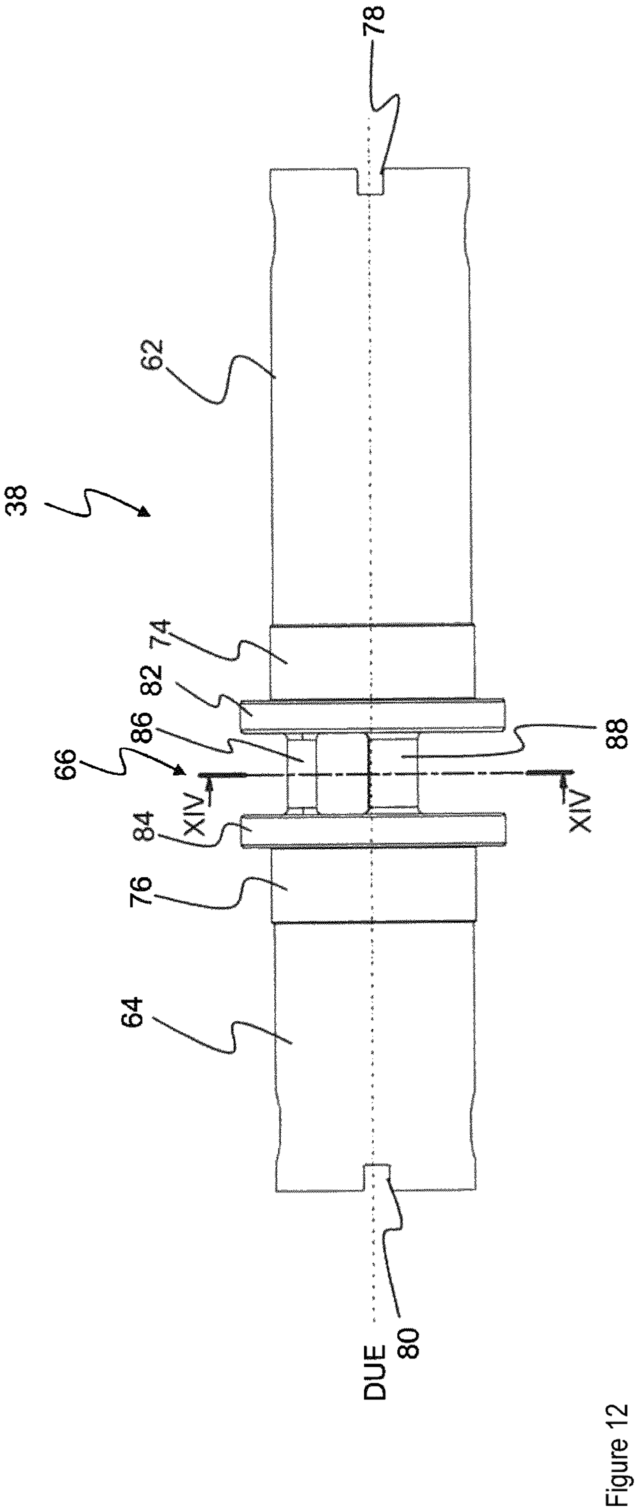
FIGS. 12 and 13 are different views of a transmission member.

FIG. 12 shows a view of the transmission member 38. The transmission member 38 comprises the two coupling portions 62 and 64 as well as the engagement portion 66 disposed in the axial direction between the coupling portions 62 and 64. The coupling portions 60 and 62 respectively have a portion 74 and 76 with an enlarged diameter. The portions 74 and 76 form a bearing section 74, 76 respectively, with which the transmission member 38 may be supported at the bearing members 36 (see FIG. 8 for example). Each coupling portion 62 and 64 has a groove 78 and 80, which extends from the end face of the respective coupling portion 62, 64 in the axial direction into the respective coupling portion 62, 64. The grooves 78 and 80 serve as lock against rotation for the sleeves 70 and 72, which are attached on the ends of the coupling portions 62 and 64 before the respective coupling portions 62, 64 are inserted into the end of the corresponding drive shaft piece 28*a* or 28*b* (see FIG. 10). The sleeves 70 and 72 may have protrusions at their radial inwardly protruding collars (see FIG. 10), which engage into the grooves 78 and 80 to prevent the sleeves 70 and 72 from rotating.

The engagement portion 66 is limited by two abutment elements 82 and 84. The abutment elements 82 and 84 may be supported by the bearing members 36 in the axial direction. The abutment elements 82 and 84 have the largest diameter of the transmission member 38. The abutment elements 82 and 84 form a guide for the drive arch 18 (see FIG. 10). The drive arch 18 extends between the two abutment elements 82 and 84 or between the side surfaces of the abutment elements 82 and 84 (see FIG. 10) opposing each other.

The engagement portion 66 has a drive member 86 and a holding member 88. The drive member 86 is, in relation to the rotational axis DUE, disposed at a distance to the holding member 88 in the radial direction. The drive member 86 is configured to engage into one of the drive recesses 40 of the drive arch 18. The holding member 88 is configured to engage into a retaining recess 42 of the drive arch 18.

Figure 13:
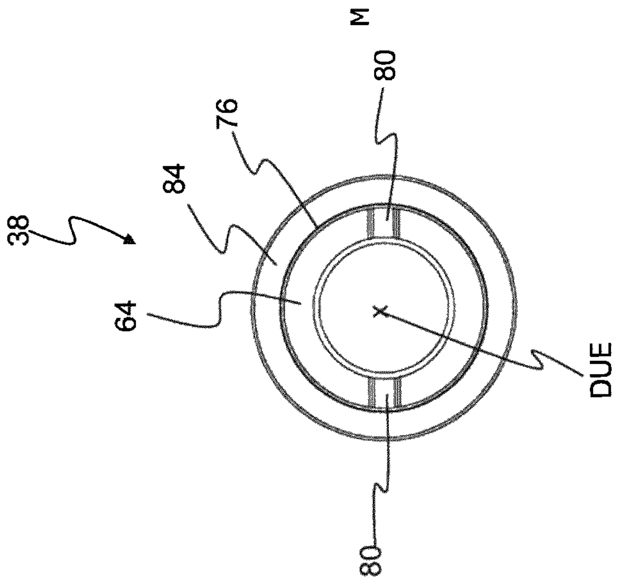

FIG. 13 shows a view of the front end of the coupling portion 64 of the transmission member 38. The coupling portion 64 is tubular. Starting from the end face of the coupling portion 64, the grooves 80 extend into the coupling portion 64 in the axial direction. With its larger diameter, the abutment element 84 forms the end of the coupling portion 64. In the same way, this is also true for the coupling portion 62 shown in FIG. 12.

Figure 14:
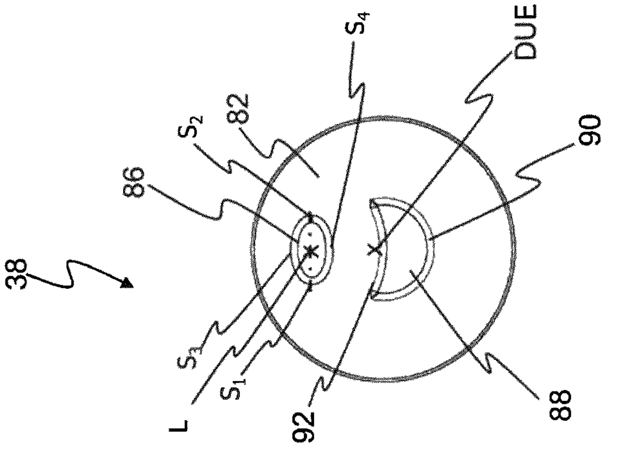
FIG. 14 is a sectional view along section line XIV-XIV in FIG. 12.

FIG. 14 shows a sectional view along section line XIV-XIV in FIG. 12. Regarding the rotational axis DUE, the drive member 86 is spaced in the radial direction of the holding member 88. Thus, there is a radial clearance between the drive member 86 and the holding member 88. The rotational axis DUE extends to the holding member 88 with a radial distance. Thus, unlike the holding member 88, the drive member 86 is disposed eccentrically.

The drive member 86 is cylindrical (see FIGS. 12 and 14). The drive member 86 has a cross section that deviates from a circular cross section and, at least in sections, exhibits a curved cross section. Regarding its longitudinal axis L, the cross section of the drive member 86 is configured in a reduced way in the radial direction compared with a circular cross section. The cross section of the drive member 86 can be described as oval, lenticular or elliptical. Due to the cross section of the drive member 86 being reduced in the radial direction, the engagement of the drive member 86 into one of the drive recesses 40 may be ensured, so that the function of the drive of the pivoting unit 16 may be guaranteed continuously. As labeled in FIG. 14, the cross section of the drive member 86 has four apexes $S_1$, $S_2$, $S_3$ and $S_4$. Between the apexes $S_1$ and $S_2$, the drive member 86 has its largest extension in one direction transverse to the radial direction, meaning in the tangential direction. In other words, the distance between the apexes $S_1$ and $S_2$ defines the largest extension of drive member 86. The apexes $S_3$ and $S_4$ are in an alignment in the radial direction. The distance between the apexes $S_3$ and $S_4$ is smaller than the distance between the apexes $S_1$ and $S_2$. Due to the smaller distance between the apexes $S_3$ and $S_4$ in the radial direction of an alignment, it becomes clear that the cross section of the drive member 86 is reduced in the radial direction. The longitudinal axis L of the drive member 86 extends parallel, but offset in the radial direction, to the rotational axis DUE of the transmission member 38.

The holding member 88 has an outer contour 90 in the form of a circular arc. The surface 92 of the holding member 88 facing the drive member 86 is curved. The surface 92 may be curved concavely. The cross section of the holding member 88 shown in the embodiment of FIG. 14 may be described as crescent-shaped. The rotational axis DUE may extend through the center point of the outer contour 90 of the holding member 88, which is shaped like a circular arc. Due to the concave curvature of the surface 92, the rotational axis DUE does not extend through the cross section of the holding member 88 but along the surface 92.

FIGS. 15*a* and 15*b* show views of the drive arch 18. The drive arch 18 has fastening apertures 94 and 96 with which the drive arch 18 may be attached to the cross member 20 (FIG. 3). The fastening apertures 94 and 96 are configured such that the drive arch 18 may be attached to the cross member 20 in different positions. The fastening apertures 94 and 96 are shaped like an elongated hole and consist of three partial openings. Each of the partial openings defines a position in which the drive arch 18 may be attached to the cross member 20. Due to the fastening apertures 94 and 96 being configured in such a way, assembly tolerances may be compensated for.

The drive arch 18 further comprises the drive recesses 40 and the retaining recesses 42. The drive recesses 40 and the retaining recesses 42 are circumferentially disposed in an alternating way of the drive arch 18. The drive recesses 40 and the retaining recesses 42 are provided at the outer periphery of the drive arch 18.

FIG. 15*b* shows an enlarged view of the section in FIG. 15*a*. The drive recesses 40 extend further into the drive arch 18 in the radial direction than the retaining recesses 42. The drive recesses 40 change their cross section in the radial direction. Starting from the entry opening 98, the cross section of the drive recess 40 initially narrows. In the direction of the radial end area or the bottom 100, the cross section of the drive recess 40 extends again.

The drive recesses 40 have opposing wall portions 102 and 104. The wall portions 102 and 104 are curved. Due to the curvature of the wall portions 102 and 104, the cross section of the drive recess 40 is reduced in the radial direction of the central area. Accordingly, the wall portions 102 and 104 have an apex $S_5$ and $S_6$, respectively. Starting from the entry opening 98, the two opposing wall portions 102 and 104 of the drive recess 40 reduce their distance A to each other until their respective apex $S_5$ and $S_6$. At the apexes $S_5$ and $S_6$, the two wall portions 102 and 104 have the smallest distance A to each other. Starting from the apexes $S_5$ and $S_6$, distance A of the two opposing wall portions 102 and 104 increases again in the direction of the radial end area or the bottom 100 of the drive recess 40. The drive recesses 40 are thus configured with an undercut. The curvature of the two opposing wall portions 102 and 104 is a convex curvature.

Below, the function of the pivoting unit 10 of FIGS. 16*a* to 18*b* is explained. FIGS. 16*a*, 17*a* and 18*a* show the drive arch 18 and the transmission member 38. In each of the three FIGS. 16*a*, 17*a* and 18*a*, the transmission member 38 has a different rotational position. Due to the rotational movement of the transmission member 38, the drive arch 18 is moved to the "left" in FIGS. 16*a*, 17*a* and 18*a*. The different positions of the grooves 80 show the changing rotational position of the transmission member 38. FIGS. 16*b*, 17*b* and 18*b* show the sections labeled respectively in FIGS. 16*a*, 17*a* and 18*a* in an enlarged way.

FIGS. 16*a* and 16*b* show a state of the drive arch 18 and of the transmission member 38, in which the holding member 88 of the transmission member 38 engages with a retaining recess 42 of the drive arch 18. Due to the holding member 88 engaging with the retaining recess 42, the set position of the drive arch 18 is secured or the drive arch 18 is locked in the set position, meaning that it is kept in the blocked position. Thus, the pivoting units 16 may even be kept in the pivoting position set in the case of relatively strong external influences, such as strong winds, without having to transmit significant torques to the drive system.

In FIGS. 17*a* and 17*b*, the transmission member 38 has been powered further. The rotational position of the holding member 88 has been changed in the retaining recess 42. The drive member 86 is located at the entry opening 96 of the drive recess 40 configured to the right of the retaining recess 42 shown in FIG. 17*b*. In this rotational position of the holding member 88 of the transmission member 38, the drive arch 18 is not yet able to be moved, since the holding member 88 is still flat in contact with the wall of the retaining recess 42.

In FIGS. 18*a* and 18*b*, the drive member 86 engages at a wall portion 102 of the drive recess 40 and further moves the drive arch 18 through the contact with the drive arch 18. This may also be recognizable from the fact that the holding member 88 is not in plane contact with the retaining recess 42 anymore but is only in contact with the retaining recess 42 at one location.

The drive unit 26, the drive shaft 28 and the at least one transmission member 38 may be coupled with each other in a torque-transmitting manner at a single axial coupling point KS1. Thus, a simple and compact design of the drive of the tracking device 10 may be achieved. Moreover, due to the axial coupling point KS1, little time is needed to connect and disconnect the individual components during assembly or maintenance work. In addition, due to the drive recesses 40 and the retaining recesses 42 at the drive arch 18, which interact with the transmission member 38, the functionality of the drive of the tracking device 10 may be guaranteed permanently.

FIG. 19 shows a view of a tracking device 10. The tracking device 10 comprises several posts 14 and several pivoting units 16*a* to 16*g*. A pivoting unit 16*a* to 16*g* is attached to the post 14, respectively. The pivoting units 16*a* to 16*g* are connected with each other in a torque-transmitting manner via the drive shafts 28.

The tracking device 10 has suspensions 106 for the drive shafts 28. Each suspension 106 is assigned to a drive shaft 28. The suspensions 106 support the drive shafts 28. For this purpose, the suspensions 106 are disposed in particular in a central area of the drive shafts 28.

FIG. 20 shows a further view of a tracking device 10. FIG. 20 shows the suspension 106. The suspension 106 is attached to a cross member element 108. The cross member element 108 is connected to the support rails 22 and 24. The suspension 106 has a connecting member 110 and a support member 112 that supports the drive shaft 28. The connecting member 110 connects the cross member element 108 with the support member 112. The connecting member 110 thus also fastens the suspension 106 to the cross member element 108. The support member 112 has a receptacle opening 114 through which the drive shaft 28 extends.

FIG. 21 shows a further view of the tracking device 10 with the suspension 106. The drive shaft 28 comprises drive shaft pieces 28*a* and 28*b*. The drive shaft pieces 28*a* and 28*b* are connected with each other at a connecting point VS. The suspension 106 is also disposed at this connecting point VS, meaning that the suspension 106 is, like connecting point VS, located in a central area of the drive shaft 28*a* formed by the drive shaft pieces 28*a* and 28*b*.

FIGS. 22 and 23 show perspective views of the tracking device 10. The suspension 106 is attached to the cross member element 108 and supports the drive shaft pieces 28*a* and 28*b* at the connecting point VS. The suspension 106 hangs down from the cross member element 108. The suspension 106 comprises the connecting member 110 and the support member 112. The connecting member 110 may be a bar, a wire, a cord or a cable. The connecting member 110 extends between the cross member element 108 and the support member 112. The suspension 106 may prevent that the drive shaft pieces 28*a* and 28*b* "sag" in their central area or at their connecting point VS. Thus, the suspension 106 may also prevent angular misalignments at the coupling points KS1 and KS2 (see FIG. 8).

FIG. 24 shows a view of the tracking device 10 that is configured to support bifacial solar modules 12. To be able to attach bifacial solar modules 12 at the tracking device 10 and to prevent or minimize a shading of the back side of the module by the support rails 22 and 24, adapter elements 114 and 116 are provided at the tracking device 10. The adapter elements 114 and 116 support the bifacial solar modules 12. The adapter elements 114 and 116 are disposed at the support rails 22 and 24. The adapter elements 114 and 116 lie against the top side of the support rails 22 and 24. Compared to FIGS. 4 to 6, the support rails 22 and 24 are moved downwards at the cross member 20 in this embodiment.

FIG. 25 shows an enlarged view of the section in FIG. 24. The adapter elements 114 and 116 are hollow sections. The adapter elements 114 and 116 lie against the top side of the support rails 22 and 24 with their bottom side. The adapter elements 114 and 116 support the bifacial solar modules 12 with their top side. The cross member 20 protrudes the upper edge of the bifacial solar module 12 in the vertical direction. This means that the cross member 20 and thus the pivoting unit 16 are disposed between two adjacent bifacial solar modules 12. In such an arrangement, the center of gravity coincides with the pivot axis or the associated location of a pivot.

FIG. 26 shows a view of an enlarged section in FIG. 25, in which the adapter element 114 and its attachment position are shown in particular. The adapter element 114 comprises a bearing portion 118 to provide bearing on the support rail 22 and a support portion 120 to support the bifacial solar modules 12. The bearing portion 118 and the support portion 120 are connected with each other via two connecting portions 122 and 124. The adapter element 114 lies against the top side of the support rail 22 with the bearing portion 118. The bearing portion 118 comprises a receptacle channel 126 that receives a fastening member not shown in FIG. 26. The support portion 120 substantially extends parallel to the bearing portion 118. Further, the support portion 122 substantially extends orthogonal to the connecting portion 120. The support portion 122 and the bearing portion 118 are connected with each other via the connecting portion 124, which extends partially in a curved manner. A positioning protrusion 128, which positions the adapter element 114 at the support rail 22, is configured at the transition between the connecting portion 124 and the bearing portion 118. The adapter elements 114 and 116 form spacers to minimize the shading at the back side of the bifacial solar modules 12.

What is claimed is:

1. A tracking device for solar modules comprising:

at least one pivoting unit, wherein the at least one pivoting unit has at least one drive arch and at least one cross member pivotable about a pivot axis, the at least one cross member being connected to the at least one drive arch, wherein the at least one drive arch has circumferentially alternating disposed drive recesses and retaining recesses, at least one post, at which the at least one cross member is pivotably mounted about a pivot axis, at least one transmission member that is rotated about a rotational axis, wherein the at least one transmission member has at least one drive element that engages into one of the drive recesses and at least one holding member that engages into one of the retaining recesses, at least one drive shaft that is coupled with the at least one transmission member, and at least one drive unit that is attached to the at least one post, wherein the at least one drive unit has at least one motor and at least one output member, wherein the at least one output member, the at least one drive shaft and the at least one transmission member are coupled to one another via a bolt in a torque-transmitting manner.

2. The tracking device of claim 1, wherein the at least one drive shaft extends through the at least one drive unit.

3. The tracking device of claim 2, wherein the at least one drive unit has at least one gearbox, wherein the at least one drive shaft extends through the at least one gearbox.

4. The tracking device of claim 1, wherein at least one coupling member is provided at the axial coupling point for providing coupling in a torque-transmitting manner between the at least one output member, the at least one drive shaft and the at least one transmission member.

5. The tracking device of claim 1, wherein at least one elastic element is disposed at the bolt to compensate an angle.

6. The tracking device of claim 1, wherein at least one elastice member is disposed in a radial direction between the at least one transmission member and the at least one drive shaft.

7. The tracking device of claim 1, wherein the at least one motor has a rotational axis, which at least essentially extends in parallel or angled to a rotational axis of the at least one drive shaft and/or wherein the rotational axis of the at least one motor extends at least essentially parallel or angled to the pivot axis.

8. The tracking device of claim 1, wherein the drive recesses have a reduced cross section in a central area in a radial direction.

9. The tracking device of claim 1, wherein the drive recesses have opposing wall portions that are curved.

10. The tracking device of claim 1, wherein the drive recesses in an area of the entry opening and in a radial end area have a larger cross section compared to a central area.

11. The tracking device of claim 1, wherein the at least one transmission member has two coupling portions, wherein each of the coupling portions is configured with at least one drive shaft piece for coupling.

12. The tracking device of claim 1, wherein the at least one holding member has a curved surface facing the at least one drive element.

13. The tracking device of claim 1, wherein the at least one post has a fastening portion and an anchoring portion, wherein the at least one pivoting unit and the at least one drive unit are disposed at the fastening portion.

14. The tracking device of claim 13, wherein the fastening portion and the anchoring portion are configured as two separate post pieces that are connectable with each other.

15. The tracking device of claim 1, wherein the at least one drive shaft consists of several drive shaft pieces that may be coupled in a torque-transmitting manner via at least one transmission member.

16. The tracking device of claim 1, wherein the at least one drive unit is attached laterally to the at least one post via at least one mounting member.

17. The tracking device of claim 1, wherein the tracking device has at least one suspension that supports the at least one drive shaft.

18. The tracking device of claim 17, wherein the at least one suspension has at least one connecting member and one support member, wherein the at least one connecting member is attached to a carrier member and extends towards at least one support member that contacts the at least one drive shaft for support.

19. The tracking device of claim 1, wherein the tracking device has at least one adapter element for attaching the solar modules.

20. The tracking device of claim 19, wherein the at least one adapter element rests on a top side of at least one support rail and has a support portion for the solar modules.

* * * * *